United States Patent
Hirano et al.

(10) Patent No.: US 8,107,448 B2
(45) Date of Patent: Jan. 31, 2012

(54) APPARATUS FOR REDUCING SIGNALLING DATA BURSTS IN MOBILE NETWORK

(75) Inventors: Jun Hirano, Kanagawa (JP); Chan Wah Ng, Singapore (SG); Mohana Dhamayanthi Jeyatharan, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 827 days.

(21) Appl. No.: 12/089,599

(22) PCT Filed: Oct. 13, 2006

(86) PCT No.: PCT/JP2006/320886
§ 371 (c)(1),
(2), (4) Date: Apr. 8, 2008

(87) PCT Pub. No.: WO2007/043708
PCT Pub. Date: Apr. 19, 2007

(65) Prior Publication Data
US 2009/0040987 A1 Feb. 12, 2009

(30) Foreign Application Priority Data
Oct. 14, 2005 (JP) .................................. 2005-301029

(51) Int. Cl.
*H04W 8/00* (2009.01)
(52) U.S. Cl. ........ 370/338; 370/331; 370/349; 370/389; 709/227; 709/238
(58) Field of Classification Search .................. 370/338, 370/331, 392, 389, 328, 349; 709/223, 224, 709/238, 245
See application file for complete search history.

(56) References Cited

U.S. PATENT DOCUMENTS

| 6,636,498 | B1 | 10/2003 | Leung |
| 7,006,472 | B1 * | 2/2006 | Immonen et al. ............. 370/332 |
| 7,779,107 | B2 * | 8/2010 | Ishiyama et al. ............. 709/223 |
| 2003/0026230 | A1 * | 2/2003 | Ibanez et al. ................... 370/338 |
| 2004/0028061 | A1 * | 2/2004 | Sawada et al. ................ 370/401 |
| 2004/0240445 | A1 * | 12/2004 | Shin et al. ..................... 370/389 |
| 2004/0246931 | A1 * | 12/2004 | Thubert et al. ................ 370/338 |
| 2005/0036471 | A1 * | 2/2005 | Singh et al. ................... 370/338 |

(Continued)

FOREIGN PATENT DOCUMENTS
WO 2005/048512 5/2005

OTHER PUBLICATIONS
International Search Report dated Jan. 26, 2007.
(Continued)

*Primary Examiner* — Ricky Ngo
*Assistant Examiner* — Rasheed Gidado
(74) *Attorney, Agent, or Firm* — Dickinson Wright PLLC

(57) ABSTRACT

A technology is disclosed for reducing the burst of DAD messages which may be triggered due to the change of the network prefix when using the technique of the neighbor discovery proxy. According to this technology, in roaming from the access network link 101 to the access network link 102, MR 121 receives advertisement of a new prefix 172 from AR 112. MR 121 selects and informs, for example only MR 122, that it is necessary to change the prefix. Thus, MR 122 and VMN 132 configure new addresses, respectively. When address configuration is completed at the mobile network of MR 122, MR 121 informs another MR 123 that it is necessary to change the prefix, and then MR 123 and VMN 133 configure new addresses, respectively. This can prevent DAD messages generated along with the address configuration from flocking in a short period.

14 Claims, 14 Drawing Sheets

U.S. PATENT DOCUMENTS

| | | | | |
|---|---|---|---|---|
| 2005/0099971 | A1* | 5/2005 | Droms et al. | 370/328 |
| 2005/0144330 | A1 | 6/2005 | Richardson | |
| 2005/0255847 | A1* | 11/2005 | Han et al. | 455/436 |
| 2005/0265259 | A1* | 12/2005 | Thubert et al. | 370/255 |
| 2006/0129630 | A1* | 6/2006 | Catalina-Gallego et al. | 709/203 |
| 2006/0140177 | A1* | 6/2006 | Karhu | 370/356 |
| 2006/0268681 | A1* | 11/2006 | Raza | 370/216 |
| 2008/0159222 | A1* | 7/2008 | Akram et al. | 370/331 |

OTHER PUBLICATIONS

Johnson, D. B., Perkins, C. E., and Arkko, J., "Mobility Support in IPv6", Internet Engineering Task Force Request For Comments 3775, Jun. 2004, p. 7, line 24.

Devarapalli, V., et. al., "NEMO Basic Support Protocol", IETF RFC 3963, Jan. 2005, p. 8, line 2.

Jeong, et al., "ND-Proxy based Route Optimization for Mobile Nodes in Mobile Network," Internet Engineering Task Force Standard-Working-Draft, draft-jeong-neuro-ro-ndproxy-00.txt, Jun. 7, 2003, pp. 1-8.

C. Ng, et al., "Network Mobility Route Optimization Solution Space Analysis," Internet Engineering Task Force Standard-Working-Draft, draft-ietf-nemo-ro-space-analysis-00, Aug. 31, 2005, pp. 1-37.

K. Weniger, et al., "IPv6 Autoconfiguration in Large Scale Mobile Ad-Hoc Networks," Proceedings of the European Wireless, 2002, pp. 1-7.

* cited by examiner

FIG. 3

| DESTINATION | NEXT-HOP | INTERFACE |
|---|---|---|
|  |  |  |
|  |  |  |
|  |  |  |
|  |  |  |
| ⋮ | ⋮ | ⋮ |
|  |  |  |

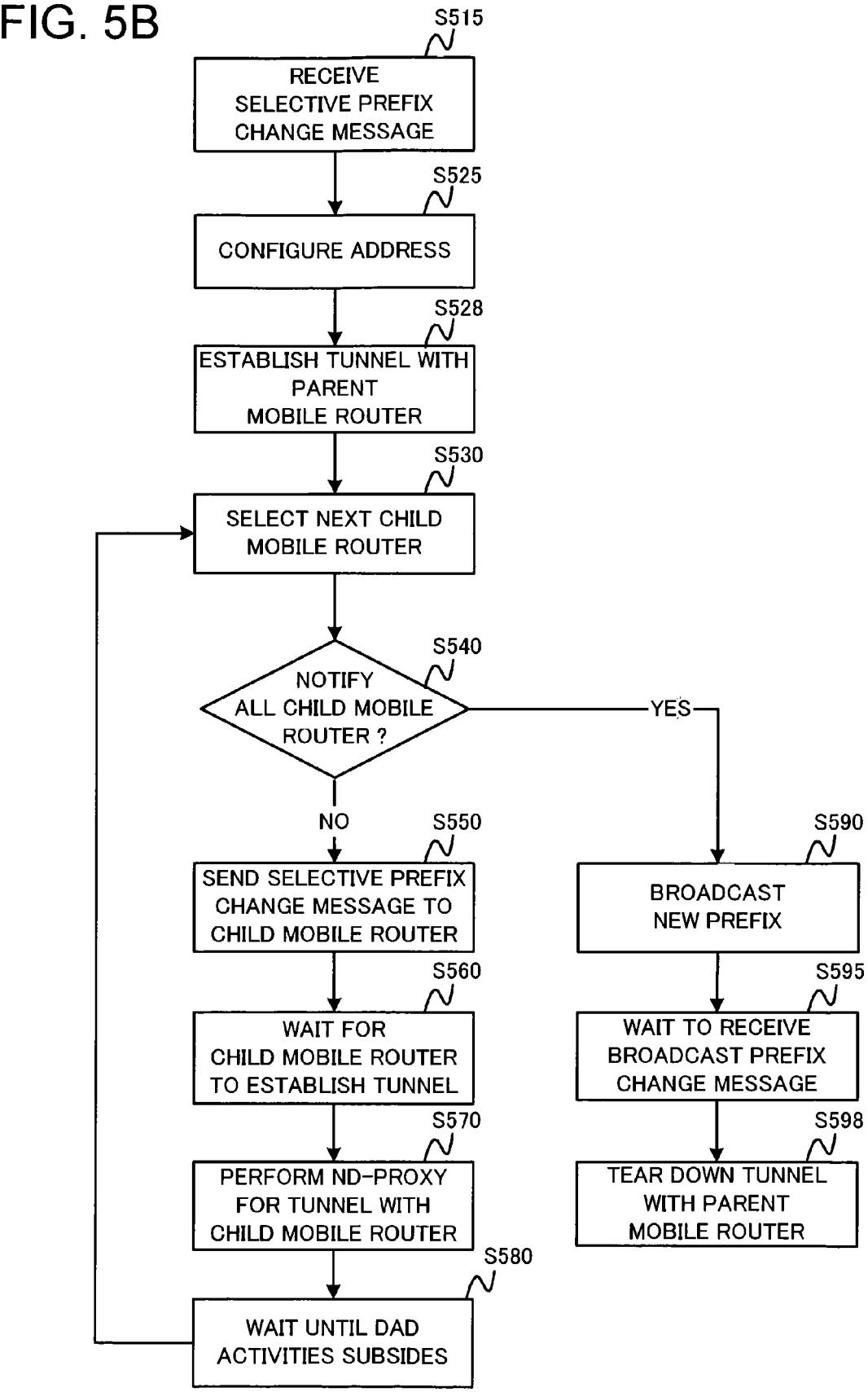

APPARATUS FOR REDUCING SIGNALLING DATA BURSTS IN MOBILE NETWORK

TECHNICAL FIELD

The present invention relates to the network management apparatus managing a packet-switched data communication network such as IP (Internet Protocol) network.

BACKGROUND ART

Many devices today communicate with each other using the IP network. In order to provide mobility support to mobile devices, the IETF (Internet Engineering Task Force) has developed the "Mobility Support in IPv6", or Mobile IP (see the following Non-Patent Document 1). In Mobile IP, each mobile node has a permanent home domain. When the mobile node is attached to its home network, it is assigned a primary global address known as a home address (HoA).

When the mobile node is away, i.e. attached to some other foreign networks, it is usually assigned a temporary global address known as a care-of address (CoA). The idea of mobility support is such that the mobile node can be reached at the home address even when it is attached to other foreign networks.

This idea is done in Mobile IP with an introduction of an entity at the home network known as a home agent (HA). Mobile nodes register their care-of addresses with the home agents using messages known as Binding Update (BU) messages. This allows the home agent to create a binding between the home address and care-of address of the mobile node. The home agent is responsible to intercept messages that are addressed to the mobile node's home address, and forward the packet to the mobile node's care-of address using packet encapsulation (i.e. putting one packet as the payload of a new packet, also known as packet tunneling).

With the ever-increasing proliferation of wireless devices, it is foreseeable that a new class of mobility technology will emerge. One of such mobility technologies is network mobility, or NEMO, where a whole network of nodes changes its point of attachment in entirety. Extending the concept of mobility support for individual hosts to mobility support for a network of nodes, the objective of a network in motion solution is to provide a mechanism where nodes in a mobile network can be reached by their primary global addresses, no matter where on the Internet the mobile network is attached to.

The IETF is currently developing solution for network mobility as disclosed in the following Non-Patent Document 2. Here, it is specified that the mobile router, when sending BU to its home agent, will specify the network prefix which the nodes in the mobile network are using. These are specified using special options known as Network Prefix Options to be inserted into the BU. These allow the home agent to build a prefix-based routing table so that the home agent will forward any packets sent to destinations with these prefixes to the care-of address of the mobile router. This idea of using a bi-directional tunnel between the mobile router and its home agent is also described in the following Patent Document 1.

Although the bi-directional tunnel allows nodes in a mobile network to be reached no matter where on the Internet the mobile network is currently attached to, it results in traffic between a mobile network node (MNN) and its correspondent node (CN) to go through a sub-optimal route, whereby every packet must go through the home agent. This increases the packet delay which may be unacceptable to real-time multimedia applications, such as Voice-over-IP. Furthermore, if there are multiple mobile networks nesting (i.e. a child mobile router attached behind a parent mobile router), there will be a nesting of bi-directional tunnels as well. This means that for a mobile network node that is nested behind, say, three mobile routers, a packet sent from a correspondent node must go through three home agents before reaching the mobile network node.

To address these concerns, there have been a lot of different proposals of what is known as route optimization. In the following Non-Patent Document 3, a method is disclosed in which mobile routers act as neighbor discovery proxy (hereinafter also referred to as ND-Proxy) its mobile network nodes. The mobile router will configure a care-of address from the network prefix (also referred to as prefix in this description) advertised by its access router, and also relay this prefix to its subnets. When a mobile network node configures an address from this prefix, the mobile router will act as a neighbor discovery proxy on its behalf. In this way, the entire mobile network and its access network form a logical multi-link subnet, thus eliminating any nesting.

Hereinafter, the above-mentioned neighbor discovery proxy is described referring the network deployment shown in FIG. 1A. In FIG. 1A, a mobile router (MR) 121 is attached to the access router (AR) 111 on the access network link 101. MR 121 gains its connection to the global communication network 100 (such as the Internet) via AR 111. Attached to the access network link 101 is also a mobile node (MN) 130.

Behind the mobile router 121, two mobile routers (MRs) 122 and 123, and a visiting mobile node (VMN) 131 are attached to the mobile network link 141. MR 122 is controlling the mobile network link 142. VMN 132 and a local-mobile network node (LMNN) 152 are attached to the mobile network link 142. MR 123 is controlling the mobile network link 143. VMN 133 and LMNN 153 are attached to the mobile network link 143.

In this description, among nodes (i.e. mobile network nodes (MNNs)) within a mobile network behind a certain MR, a node, whose basic point of attachment is this MR, is referred to as a local mobile network node (LMNN). It is preferable that LMNN configures its address according to the specification of NEMO Basic support (that means a node behind MR configures its address, using a mobile network prefix being advertised by MR from the time that MR connects to its home network).

The idea of neighbor discovery proxy is that MR 121 will advertise the network prefix 171 announced by AR 111 on the access network link 101 to its mobile network link 141. This enables MR 122, MR 123, and VMN 131 to configure their care-of addresses from prefix 171. MR 122 and MR 123 will also advertise prefix 171 to their mobile network links 142 and 143 respectively, thus allowing VMN 132 and VMN 133 to configure their care-of addresses from prefixes 171 as well. Here, VMN is a node within a mobile network which configures its care-of address based on a prefix advertised by MR when connecting to the MR. As the above, LMNN 152 and LMNN 153 have addresses with, the same mobile network prefix as those advertised by MR 122 and MR 123 connecting to their home networks, respectively. Thus, LMNN 152 and LMNN 153 need not reconfigure their addresses due to the change of the prefixes being advertised by MRs after MRs have roamed.

As a neighbor discovery proxy, MR 121 will forward any packet with a source address configured from prefix 171 on the mobile network link 141 to the access network link 101. Conversely, MR 121 will forward packets with a destination address falling within prefix 171 on the access network link 101, to the mobile network link 141. Similarly, MR 122 will forward any packet with a source address configured from prefix 171 on the mobile network link 142 to the mobile network link 141, and forward packets with a destination address falling within prefix 171 on the mobile network link 141 to the mobile network link 142. Again, MR 123 will forward any packet with a source address configured from prefix 171 on the mobile network link 143 to the mobile network link 141, and forward packets with a destination address falling within prefix 171 on the mobile network link 141 to the mobile network link 143.

In this way, from the point of view of CN 160 on the global communication network 100, MR 121, MR 122, MR 123, MN 130, VMN 131, VMN 132 and VMN 133 are all connected to the access network link 101, since they all have care-of addresses configured from the same network prefix 171. This point of view is illustrated in FIG. 1B.

In FIG. 1B, VMN 131 is virtually attached to the access network link 101 through the virtual attachment 183, created by MR 121 performing the neighbor discovery proxy through the mobile network link 141. VMN 132 is also virtually attached to the access network link 101 through the virtual attachment 181, created by MR 122 performing the neighbor discovery proxy through the mobile network link 142. VMN 133 is also virtually attached to the access network link 101 through the virtual attachment 185, created by MR 123 performing the neighbor discovery proxy through the mobile network link 143. In this way, MN 130 and VMN 131, VMN 132 and VMN 133 can use the standard Mobile IPv6 Route Optimization technique specified in the Non-Patent Document 1 to communicate with CN 160.

[Non-Patent Document 1] Johnson, D. B., Perkins, C. E., and Arkko, J., "Mobility Support in IPv6", Internet Engineering Task Force Request For Comments 3775, June 2004.

[Non-Patent Document 2] Devarapalli, V., et. al., "NEMO Basic Support Protocol", IETF. RFC 3963, January 2005.

[Non-Patent Document 3] Jeong, J., et. al., "ND-Proxy based Route Optimization for Mobile Nodes in Mobile Network", IETF Internet Draft: draft-jeong-nemo-ro-ndproxy-02.txt, February 2004, expired.

[Patent Document 1] U.S. Pat. No. 6,636,498

[Patent Document 2] U.S. Patent Application Publication 2005/0144330

[Patent Document 3] U.S. Patent Application Publication 2005/0036471

[Patent Document 4] PCT Application Publication WO2005/048512.

Although the above-mentioned neighbor discovery proxy disclosed in the Non-Patent Document 3 seems an elegant way to solve the route optimization problem for network mobility support, there is one main limitation: whenever the mobile network changes its point of attachment, the prefix announced by the access router has changed, and every node in the mobile network using the prefix announced by the access router based on the neighbor discovery proxy must now re-configure their care-of addresses.

It is possible that, behind MR implementing both the neighbor discovery proxy and network mobility support, there are LMNNs and nodes which have configured their addresses using the prefix announced by the access router MR is connecting to. As the above, nodes which need to re-configure their addresses due to the movement of MR are those which have configured their addresses using the prefix announced by the access router MR is connecting to, such as VMN 131-133, MR 122 and MR 123 which need to change the prefix of their addresses from the prefix 171 to the prefix 172 when MR 121 changes its point of attachment from AR 111 to AR 112.

Current IPv6 address configuration uses two main approaches: address: auto-configuration and dynamic host configuration. In address auto-configuration, a node is supposed to generate an IP address based on its hardware address and the announced prefix, and perform a procedure known as Duplicate Address Detection (DAD) to ascertain that the address it has generated is unique. DAD requires the node to send out at least one Neighbor Solicitation (NS) broadcast message. In dynamic host configuration approach, a node sends out an address request broadcast message. A server would respond to this request by assigning an address to the node. This is also known as the Dynamic Host Configuration Protocol (DHCP).

In both approaches of address auto-configuration and dynamic host configuration, a node needs to send out at least one broadcast message. So, when a large mobile network changes its point of attachment, the number of messages generated will be enormous and simultaneous. This may cause temporary congestions and further delay in the address configuration.

Hereinafter, this problem will be described referring to the example of composition in FIG. 1A and FIG. 1B. When MR 121 moves from an access network link 101 to an access network link 102, it will receive a new access network prefix 172 being announced by AR 112. This will not only cause a change in the care-of address of MR 121, it will also cause MR 122, MR 123, VMN 131, VMN 132 and VMN 133 to change their care-of addresses. Due to the need for DAD, each of these nodes need to send out a Neighbor Solicitation message, which MR 121, MR 122 and MR 123 operating as neighbor discovery proxies, need to forward to an access network link 102, mobile network links 141, 142 and 143.

This problem of DAD has been addressed by various teachings in the prior art. In the technology disclosed by the Patent Document 2, the home agent of a mobile node is used to resolve the conflict of the mobile node's home address. In the technology disclosed by the Patent Document 3, a fast DAD entity is introduced in a distributed system to rapidly resolve address conflicts of mobile nodes in the foreign network. In the technology disclosed by the Patent Document 4; mobile network nodes optimally communicate with an address and prefix delegating entity in the foreign network. None of these technologies disclosed by the Patent Documents 2-4 can substantially ease the burst of traffic due to signaling (large volume of traffic streaming within a short period) when a mobile network using the neighbor discovery proxy method disclosed in the Non-Patent Document 3 changes its point of attachment.

A person skilled in the art would also appreciate that even though the neighbor discovery proxy method for route optimization is specifically illustrated in this description, other route optimization schemes may have similar signaling burst problems as well. For instance, it is possible to use Hierarchical Mobile IPv6 technology to provide nested tunnel optimization. Here, every mobile network node would obtain a regional care-of address from the mobility anchor point (which may be a fixed or mobile router). All mobile network nodes would need to change their regional care-of addresses when the mobile network changes to a different mobility anchor point, thus causing a massive amount of binding update messages being sent.

DISCLOSURE OF THE INVENTION

In view of the above problems, it is therefore an object of the present invention to provide the network management apparatus capable of reducing the burst of DAD messages which may be triggered due to the change of the network prefix when using the technique of the neighbor discovery proxy.

To achieve the object of the present invention, the present invention provides a network management apparatus comprising:

a first network interface for connecting to a first network managed by a different communication apparatus;

a second network interface which belongs to a second network managed by itself;

a prefix advertising means for advertising a valid network prefix on the first network to the second network as a valid network prefix on the second network; and a burst controlling means for controlling such that a burst of traffic is not triggered by a network prefix change advertisement including a new network prefix on the first network.

According to this construction, it is possible to reduce the burst of DAD messages which may be triggered due to the change of the network prefix.

Furthermore, in addition to the above-mentioned construction, in the network management apparatus of the present invention, the burst controlling means comprises:

a prefix notification selection means for selecting a part of a plurality of network management apparatuses which are connected to the second network when the network prefix change advertisement including the new network prefix is received on the first network interface; and a selective prefix advertising means for advertising the network prefix change advertisement including the new network prefix to the selected network management apparatus by the prefix notification selection means.

According to this construction, it is possible to reduce the burst of DAD messages which may be triggered due to the change of the network prefix.

Furthermore, in addition to the above-mentioned construction, in the network management apparatus of the present invention, the prefix notification selection means is so arranged as to select the plurality of network management apparatuses which are connected to the second network in sequence at different times.

According to this construction, it is possible to disperse the burst of DAD messages in terms of time, thereby reducing the burst of DAD messages which may be triggered due to the change of the network prefix.

Furthermore, in addition to the above-mentioned construction, in the network management apparatus of the present invention, the prefix advertising means is so arranged as to initiate advertisement of the new network prefix as a valid prefix on the second network after completion of selecting all the plurality of network management apparatuses which are connected to the second network.

According to this construction, it is possible to properly select a network management apparatus and to have the selected network management apparatus perform address configuration procedures, and thereby it is possible to reduce the burst of DAD messages which may be triggered due to the change of the network prefix.

Furthermore, in addition to the above-mentioned construction, the network management apparatus of the present invention comprises a tunnel establishing means for establishing a tunnel with the selected network management apparatus by the prefix notification selection means.

According to this construction, it is possible for the network management apparatus to certainly receive packets from the selected network management apparatus.

Furthermore, in addition to the above-mentioned construction, the network management apparatus of the present invention a tunnel monitoring means for monitoring packet traffic received through the tunnel, and in the network management apparatus, the prefix notification selection means is so arranged as to select another part of the plurality of network management apparatuses which have not yet been selected when the traffic becomes lower than predetermined threshold level.

According to this construction, it is possible for the network management apparatus to readily check the network traffic state of the selected network management apparatus by using the tunnel.

Furthermore, in addition to the above-mentioned construction, in the network management apparatus of the present invention, the burst controlling means comprises:

a tunnel establishing means for establishing a tunnel with a sender of the network prefix change advertisement when the network prefix change advertisement including the new network prefix is received on the first network interface; and a tunnel forwarding means for, when receiving a duplicate address message of an address which is configured based on the new network prefix by a certain communication apparatus, forwarding the duplicate address detection message through the tunnel.

According to this construction, it is possible to reduce the burst of DAD messages which may be triggered due to the change of the network prefix, and it is possible for the network management apparatus to notify of the network traffic state by using the tunnel.

Furthermore, in addition to the above-mentioned construction, the network management apparatus of the present invention comprises a tunnel tearing means for tearing the tunnel down when receiving a broadcast message including the new network prefix on the first network interface.

According to this construction, it is possible for the network management apparatus to check the completion of changing to: the new network prefix by notification of a broadcast message with the new prefix.

Furthermore, in addition to the above-mentioned construction, in the network management apparatus of the present invention, the burst controlling means comprises:

an address collecting means for collecting addresses which are configured based on the new network prefix by all communication apparatuses residing in the second network when the network prefix changes; and an address list creating means for creating an address list where all the collected addresses by the address collecting means are specified.

According to this construction, it is possible to reduce the burst of DAD messages which may be triggered due to the change of the network prefix, by collecting an address specified in a DAD message sent from each communication apparatus into an address list.

Furthermore, in addition to the above-mentioned construction, the network management apparatus of the present invention comprises an address list sending means for sending the address list created by the address list creating means within the first network through the first network interface.

According to this construction, it is possible to reduce the traffic by transferring the address list where the addresses within DAD messages are aggregated toward the upper network (the network of the parent mobile router side).

Furthermore, in addition to the above-mentioned construction, the network management apparatus of the present invention comprises an address list receiving means for receiving the address list created by a network management apparatus which is connected to the second network and manages a third network, and in the network management apparatus, the address list creating means is so arranged as to create an address list further including addresses which are specified in the address list received by the address list receiving means.

According to this construction, it is possible to aggregate addresses used in the lower network into the address list by receiving the address list where the addresses within DAD messages are aggregated from the lower network (the network of the child mobile router side).

Furthermore, in addition to the above-mentioned construction, the network management apparatus of the present invention comprises an address conflict checking means for checking a conflict among the addresses, and in the network management apparatus, the address list creating means is so arranged as to insert an address that no conflict has been checked by the address conflict checking means to the address list.

According to this construction, it is possible to specify only addresses with no conflict in the address list.

Furthermore, in addition to the above-mentioned construction, the network management apparatus of the present invention comprises an address conflict resolving means for resolving a conflict with respect to an address with the conflict found by the address conflict checking means.

According to this construction, it is possible to initiate address conflict resolution procedures promptly upon detecting an address with a conflict, thereby reducing the period for the communication apparatus involved in the conflict to restart communication.

Furthermore, in addition to the above-mentioned construction, in the network management apparatus of the present invention, the address conflict resolving means is mounted on an access router or a mobile router.

According to this construction, it is possible for the access router residing at the top of the nested composition of the network, or for the mobile router residing at the intermediate of the nested composition of the network to perform address conflict resolution procedures with respect to the collected addresses.

Furthermore, in addition to the above-mentioned construction, the network management apparatus of the present invention comprises an address conflict resolution performance advertising means for advertising, to lower-level connected communication apparatuses behind itself, that the address conflict resolving means performs procedures to resolve the conflict.

According to this construction, it is possible that the network management apparatus informs communication apparatuses which are connected behind the network management apparatus itself that it has the function of address conflict resolution, so that addresses of these communication apparatuses can aggregate at the network management apparatus. Thereby, it is possible for the network management apparatus to perform the address conflict resolution procedures together.

The present invention comprising the foregoing construction has the advantage of reducing the burst of DAD messages which may be triggered due to the change of the network prefix when using the technique of the neighbor discovery proxy. Especially, the present invention has the advantage of reducing the burst of DAD messages which may be triggered when the mobile router (and the mobile network) changes its point of attachment. Furthermore, the present invention also has the advantages of avoiding the traffic congestion and preventing the communication delay.

BRIEF DESCRIPTION OF THE DRAWINGS

FIG. 3 is a diagram showing a preferred set of contents stored as an entry of Routing Table in the embodiment of the present invention;

FIG. 5B is a; flowchart of a preferred algorithm which a mobile router can use to perform the method of selective notification when the mobile router receives a selective prefix change message from its parent mobile router in the embodiment of the present invention;

BEST MODE FOR CARRYING OUT THE INVENTION

Figure 1A:
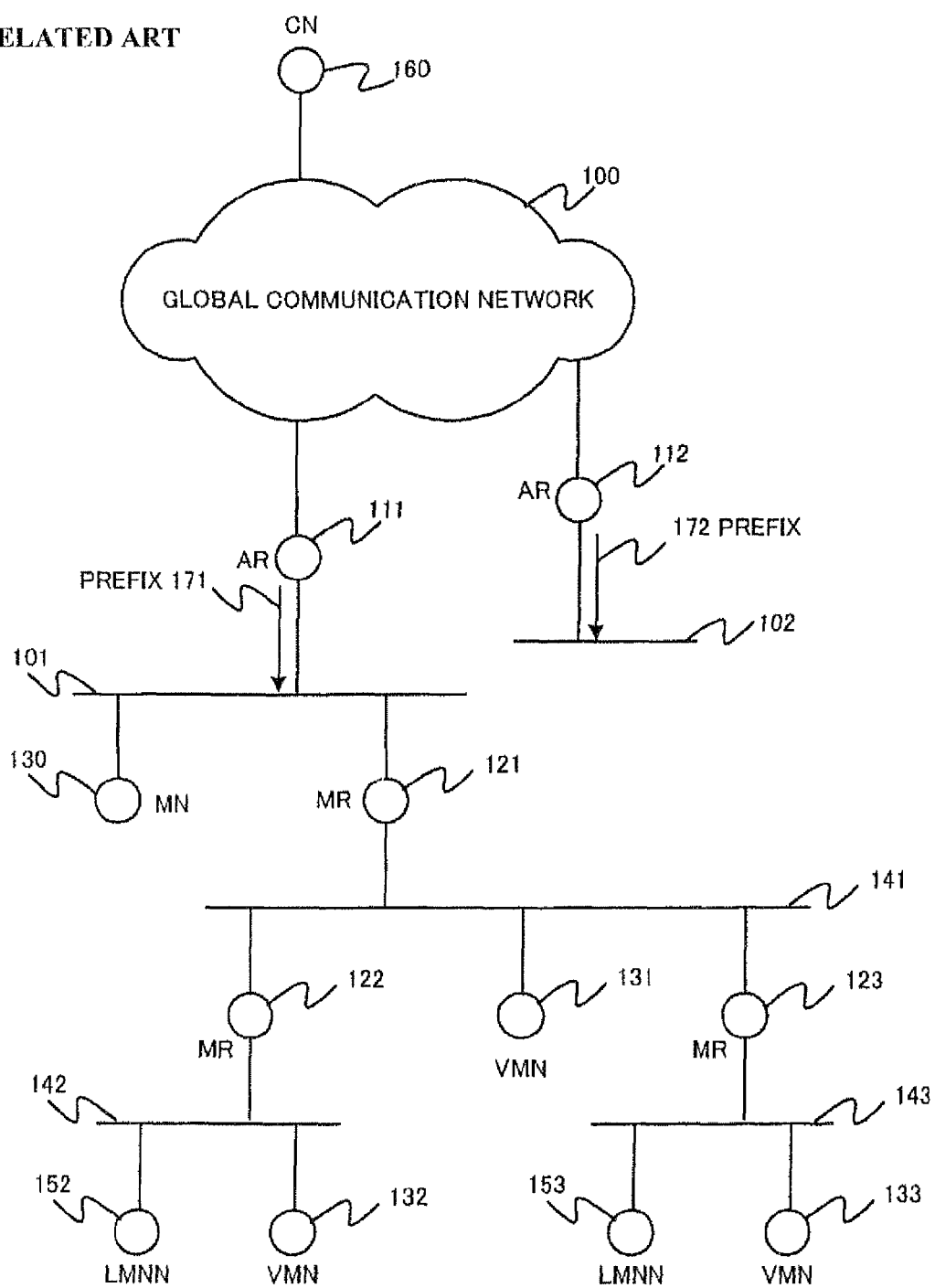
FIG. 1A is a diagram showing an example of network composition referred in the description about the prior art and the embodiment of the present invention.

Description will be given below on the embodiment of the present invention referring to the drawings.

In this description, the term "proxied node" is referred to as the node in which the neighbor discovery proxy is being performed on behalf of. For instance, it is supposed that MR 121 is performing the neighbor discovery proxy on behalf of MR 122 in the example illustrated in FIG. 1A. Then, MR 122 is referred to as the "proxied node" with respect to MR 121.

Similarly in this description, the term "proxied address" is referred to as the address of the proxied node in which the neighbor discovery proxy is being performed on behalf of. In addition, in this description, the term "child mobile router" is referred to as a mobile network node which is itself a mobile router that is attached to another mobile router. Conversely, in this description, the term "parent mobile router" is referred to as the access router which is itself a mobile router. Using the example in FIG. 1A, MR 122 and MR 123 are the child mobile routers of MR 121, and MR 121 is the parent mobile router of MR 122 and MR 123.

There are two main methods disclosed in this description to reduce the burst of signaling messages after a handoff. The first method is for the mobile router to selectively delay the broadcast of new prefix to mobile network nodes. The second method is for the mobile router to aggregate the newly configured addresses of mobile network nodes on each mobile network link, and submit this list of new addresses to its access router (which maybe another mobile router) for duplicate address detection (DAD). After we have described these two methods, it should be obvious to a person skilled in the art that these two methods are orthogonal to each other, and may in fact be combined wholly or partially in any single preferred implementation of the present invention.

Figure 2:
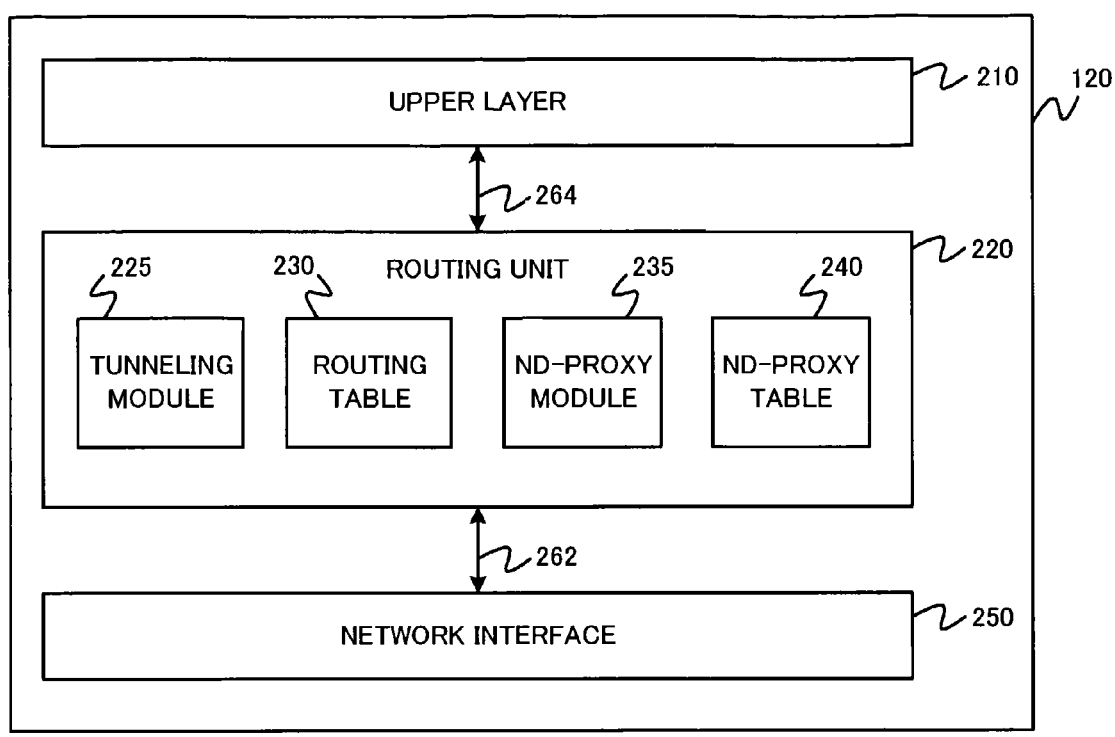
FIG. 2 is a diagram showing functional architecture of a mobile router in the preferred embodiment of the present invention.

As both the first and second methods are employed by mobile routers, the functional architecture of a mobile router according to a preferred embodiment of the present invention is first described. FIG. 2 shows the functional architecture of a mobile router (MR) 120 according to a preferred embodiment of the present invention. The functional architecture of MR 120 contains an Upper Layer 210, a Routing Unit 220, and a single or plurality of Network Interfaces 250.

Each Network Interface 250 is a functional block that represents all networking hardware, software and protocols that are necessary to allow the MR 120 to communicate with other nodes using a link access technology. For instance, under the International Standards Organization's (ISO) Open System Interconnect (OSI) 7-layers model, the Network Interface 250 will encompass the Physical and Data Link Layers. Whenever the Network interface 250 receives a packet, it will pass the packet to the Routing Unit 220 for further processing via the data path 262. Similarly, whenever the Routing Unit 220 has packet to be transmitted, it will pass the packet to the corresponding Network Interface 250 for transmission via the data path 262.

The Upper Layer 210 is a functional block that represents all software, user programs, and session transport protocols. Under the OSI model, it will encompass all functionalities of Applications, Presentation, Session, and Transport Layers. After processing a packet, if the Routing Unit 220 determines that the packet is meant for the mobile router 120, the packet is passed to the Upper Layer 210 for further processing via the data path 264. Similarly, whenever the Upper Layer 210 has data to send, it will pass the packet down to the Routing Unit 220 for transmission via the data path 264.

The Routing Unit 220 handles all processing with respect to routing in the internetworking layer. Under the OSI model, it will encompass all functionalities of Network Layer. The Routing Unit 220 basically implements the IPv6 and NEMO Basic Support functionality. Within the Routing Unit 220, there are Tunneling Module 225, Routing Table 230, ND-Proxy Module 235, and ND-Proxy Table 240.

The Tunneling Module 225 establishes, maintains, and tears down IP tunnels as necessary. For instance, under NEMO Basic Support, mobile routers would establish a bi-directional tunnel with its home agent. This is maintained by the Tunneling Module 225. As would be described later, the Tunneling Module 225 is also responsible to set up temporary tunnels with parent and child mobile routers. A person skilled in the art would recognize that it is preferable for the Tunneling Module 225 to create a virtual network interface known as a tunnel interface. This tunnel interface would be seen by the Routing Unit 220 as equivalent to another Network Interface 250.

Figure 3:
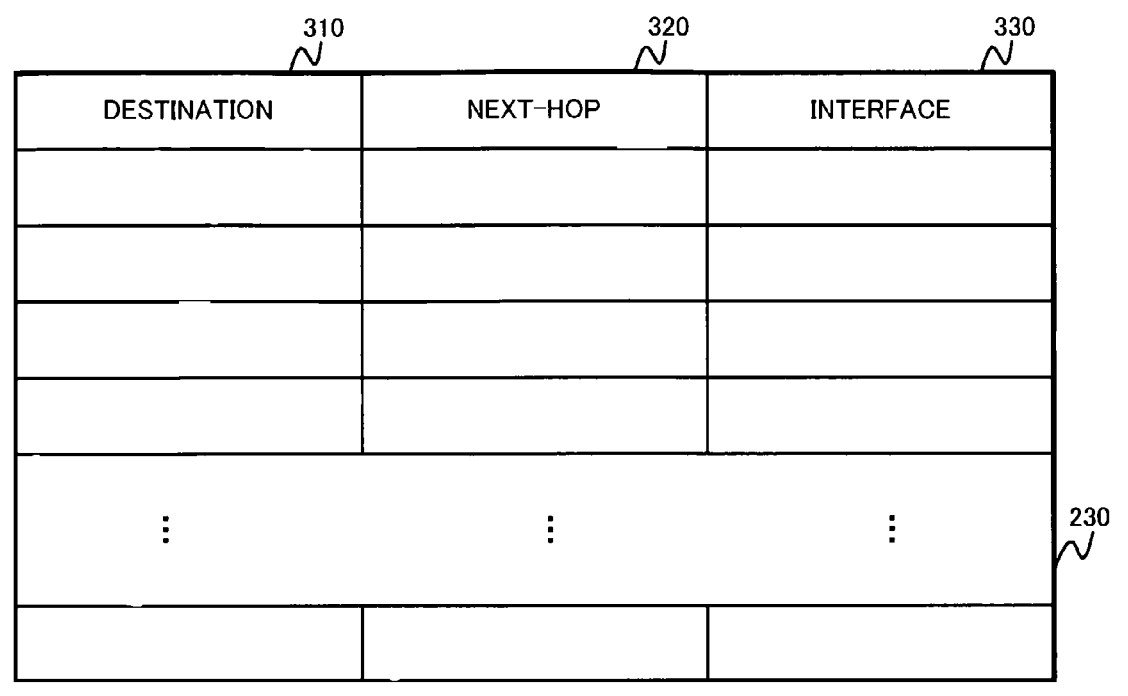

The Routing Table 230 contains the information for the Routing Unit 220 to make routing decisions. FIG. 3 shows one preferred set of contents to be stored in one entry of the Routing Table 230 according to the embodiment of the present invention. This set of contents includes, for example, the Destination field 310, the Next Hop field 320 and the Interface field 330. The Destination field 310 stores the prefix or full address of a destination, and the Next Hop field 320 and/or the Interface field 330 specify where a packet should be forwarded to given its destination matches the value stored in the Destination field 310. The Next Hop field 320 gives the IP address of the next hop router to forward the packet to, and the Interface field 330 specifies which Network Interface 250 the packet should be routed through. Note that the Interface field 330 may also specify a tunnel interface created by the Tunneling Module 225. Also, a person skilled in the art would recognize that the Routing Table 230 can contain other fields, such as a preference field, that are omitted from FIG. 3.

The ND-Proxy Module 235 handles the operation of acting as a neighbor discovery proxy on behalf of other nodes. A preferred implementation of the ND-Proxy Module 235 is to inject routing entries into the Routing Table 230 so that packet addressed to a proxied node in which the mobile router 120 is acting on behalf as a neighbor discovery proxy would be routed to the correct network interface where the proxied node resides.

Figure 4:
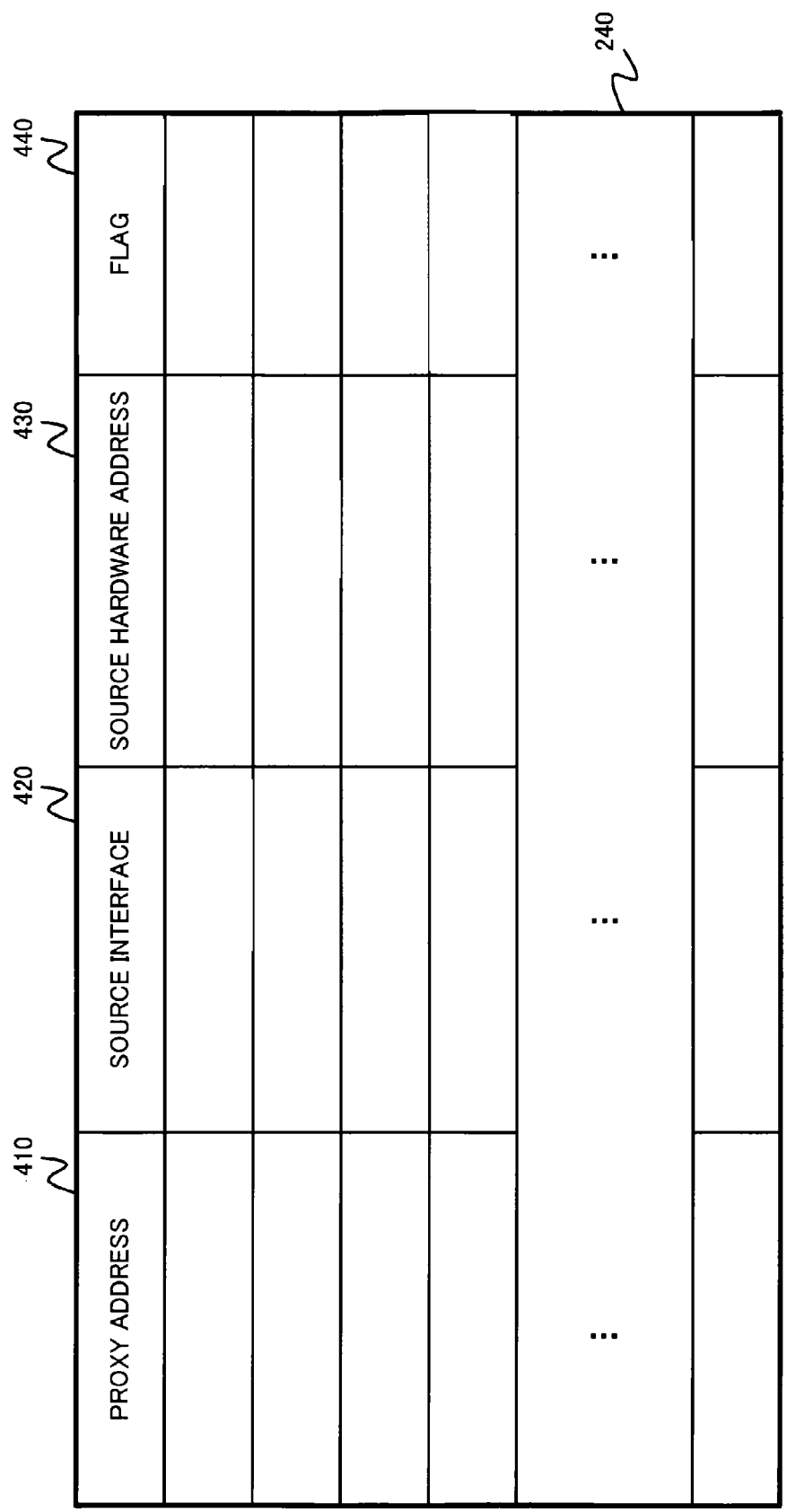
FIG. 4 is a diagram showing a preferred set of contents stored as an entry of ND-Proxy Table in the embodiment of the present invention.

The ND-Proxy Table 240 contains the information for the ND-Proxy Module 235 to make decisions on performing neighbor discovery proxy on behalf of proxied nodes. FIG. 4 shows one preferred set of contents to be stored in one entry of the ND-Proxy Table 240 according to a preferred embodiment of the present invention. This set of contents includes, for example, the Proxy-Address field 410, the Source Interface field 420, the Source Hardware Address field 430 and the Flags field 440.

The Proxy-Address field 410 contains the IP address in which the mobile router is acting as a neighbor discovery proxy on behalf of. The Source Interface field 420 contains an identifier that uniquely identifies one of the Network Interface 250 which is connected to the network link where the proxied address can be reached. The Source Hardware Address field 430 contains an identifier that uniquely identifies the link layer address of the proxied node. The Flags field 440 is used to store various different information of the proxied node, such as using a bit of the Flags field 440 to indicate if the proxied node is itself a mobile router, and using another bit of the Flags field 440 to indicate if the proxied node has received a new prefix. The use of Flags field 440 would become clear later in this description.

Having described the functional architecture of a mobile router, the above two methods will be disclosed next. To better illustrate the present invention, the deployment example shown in FIG. 1A will be hereinafter used. It can then be understood that the mobile router 120 described earlier is a generic term that could be used to refer to any of MR 121, MR 122 and MR 123 in FIG. 1A.

The first method is now described. This first method, in essence, has the mobile router (parent mobile router) selectively notifies its child mobile routers of the change in prefix in sequence (i.e. at slightly different times), thereby limiting the number of DAD messages at any one time to be limited to the number of mobile nodes on any mobile network link. Using the example shown in FIG. 1A, MR 121 will first notify MR 122 of the change in prefix, and allow the burst of DAD activity from the mobile network link 142 to pass before notifying the next mobile router (e.g. MR 123) of the new prefix. Due to its nature of operation, this first method is henceforth referred to as the method of selective notification.

Figure 5A:
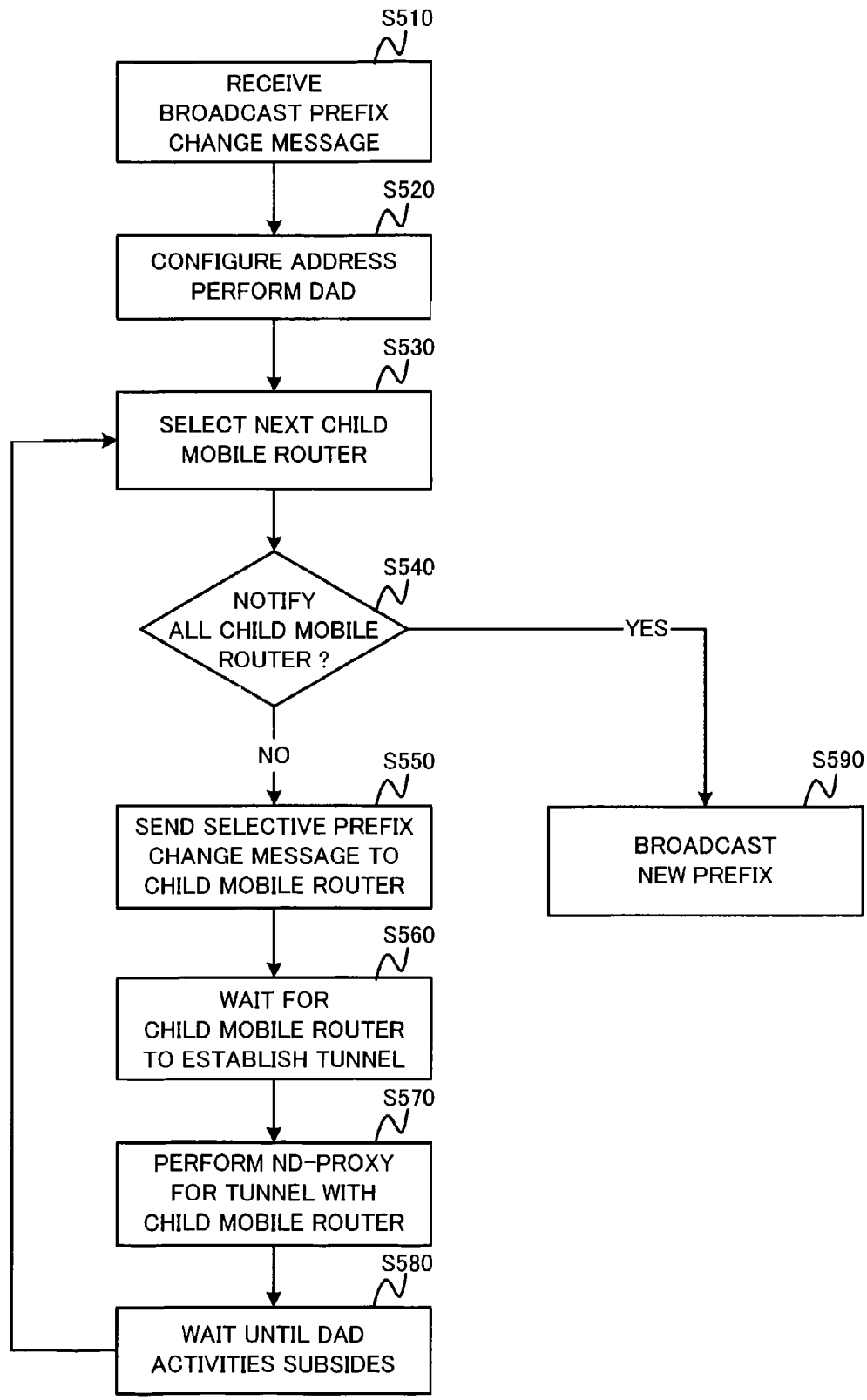
FIG. 5A is a flowchart of a preferred algorithm which a mobile router can use to perform the method of selective notification when the mobile router receives a broadcast prefix change message in the embodiment of the present invention.

FIG. 5A shows the flowchart of an algorithm a mobile router 120 can preferably use to achieve the method of selective notification when the mobile router 120 receives a broadcast prefix change message, according to a preferred embodiment of the present invention. This broadcast prefix change message can be in different forms, including, but not limited to, a broadcast router advertisement message advertising a different network prefix, or a DHCP message specifying a change of network prefix. This can happen when MR 121 changes its point of attachment, such as in movement from the access network link 101 to the access network link 102 in FIG. 1A. In FIG. 5A, after receiving the broadcast prefix change message in step S510, the mobile router 120 can then configure a new care-of address based on this prefix and perform DAD on the interface that the broadcast prefix change message is received in step S520. After DAD is completed, the mobile router 120 then enters the loop from steps S530 through S580, which performs the selective delay algorithm. In step S530, the mobile router 120 selects a child mobile router that has not yet been informed of the change in prefix. One preferable way in which the mobile router 120 can know whether a node is a child mobile router or not is to make use of one of the bits in the Flags field 440 in the ND-Proxy Table 240.

If all child mobile routers have been notified of the change in prefix, then in step S540, the algorithm exits the loop and proceeds to step S590 where a new prefix is broadcasted to all nodes in the mobile network. If there is a child mobile router that has not yet been informed of the prefix change, then in step S540, the algorithm proceeds to steps S550 through S580. One preferable way in which mobile router 120 can know whether a child mobile router has or has not receive the notification is to make use of one of the bits in the Flags field 440 in the ND-Proxy Table 240.

In step S550, the mobile router 120 sends a selective prefix change message to the child mobile router. This message notifies the child mobile router that the prefix of the access network has changed. The mobile router 120 then waits for the child mobile router to establish a temporary tunnel with itself, as shown in step S560. Once the tunnel is establish, the mobile router 120 can then act as ND-Proxy for the new prefix on behalf of the child mobile router through the established tunnel in step S570. This means that the mobile router 120 will forward any packet with a source address configured from the new prefix received from the tunnel to other network links where the new prefix is in effect. Conversely, the mobile router 120 will forward packets with a destination address falling within the new prefix from other network interfaces to the child mobile router through the tunnel. This can preferably be done by adding appropriate route entry into the Routing Table 230.

In step S580, the mobile router 120 waits for the DAD activities from the tunnel to fall below a certain threshold. This can be done by monitoring the rate of packets received from the tunnel. Once the rate falls below a certain threshold, the algorithm will loop back to step S530. Alternatively, the mobile router 120 can simply wait for an arbitrary period of time before proceeding to step S530. In steps S530 and S540, if the mobile router 120 finds that there is no more child mobile router that is not informed of the new prefix, step S590 is taken, where the new prefix is now broadcasted to all nodes in the mobile network.

FIG. 5B shows the flowchart of an algorithm a mobile router 120 can preferably use when the mobile router 120 receives selective prefix change notification from its parent mobile router, according to the embodiment of the present invention. This selective prefix change message can be in different forms, including, but not limited to, a unicast router advertisement message advertising a different network prefix, or a DHCP message specifying a change of network prefix, that is sent directly to the mobile router 120. Most steps in FIG. 5B are identical to FIG. 5A, and each of these identical steps is given the same reference numeral. The only parts that differ are the beginning and ending steps of the algorithm. These are explained below.

After receiving the selective prefix change message in step S515, the mobile router 120 proceeds to configure a new care-of address from the new prefix, as shown in step S525. Next, in step S528, the mobile router 120 establishes a tunnel with its parent mobile router (i.e. the sender of the selective prefix change message received in step S515). By establishing this tunnel, the mobile router 120 will also have to perform DAD for its newly configured care-of address on this tunnel. After which, the mobile router 120 can proceed to the loop from steps S530 through S580, which performs the selective delay algorithm. These steps are described previously, thus their explanation is hereby omitted. After exiting the loop, in step S590 the new prefix is advertised to the mobile network using a broadcast router advertisement message. The mobile router 120 then waits for the new prefix to be broadcasted by the parent mobile router in step S595. Before completing the algorithm, the mobile router 120 will have to tear down the tunnel it establishes with its parent mobile router in step S598.

Figure 6:
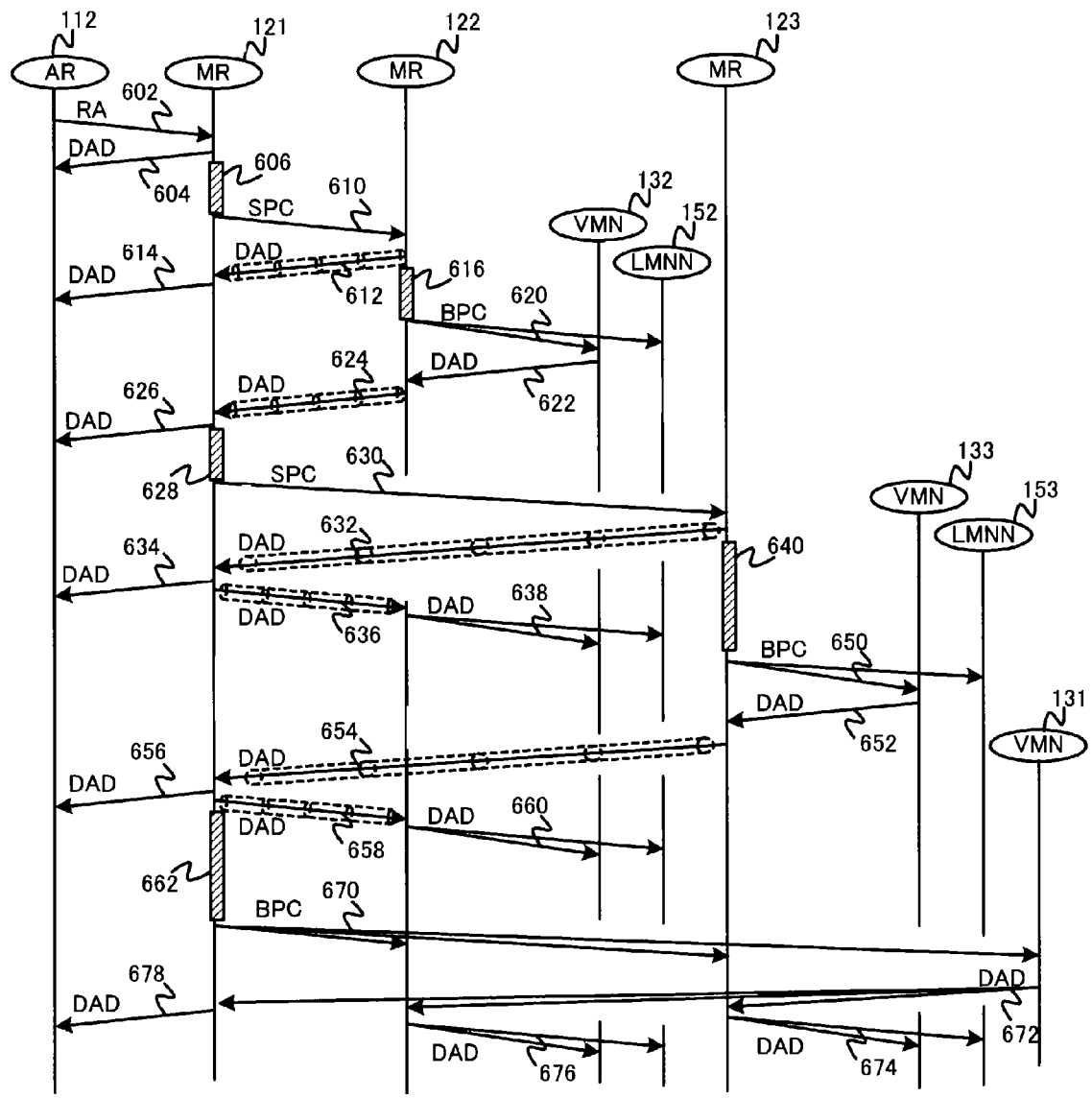
FIG. 6 is a message sequence chart of the operation when an entire mobile network changes the access network links according to the method of selective notification in the embodiment of the present invention.

To illustrate the method of selective notification, FIG. 6 shows the message sequence chart in operation when the entire mobile network inclusive of MR 121 in the network deployment example of FIG. 1A moves from the access network link 101 to the access network link 102, according to the embodiment of the present invention. After moving to the access network 102, MR 121 would receive the periodic router advertisement message (RA) 602 from AR 112, which contains the new prefix 172. MR 121 notices the prefix change, and will trigger the algorithm illustrated in FIG. 5A. At step S520, MR 121 configures a care-of address from this new prefix 172, and performs duplicate address detection on the access network link 102. Thus, MR 121 broadcasts a DAD message 604 to the access network link 102. After a short time period 606, in case that no address conflict is detected, MR 121 proceeds to step S530, where it selects MR 122 as the first child mobile router to receive the selective prefix change notification. This is shown in FIG. 6 as the SPC (Selective Prefix Change) message 610.

Having received this SPC message 610, MR 122 will know that the prefix has changed from the prefix 171 to the prefix 172, and trigger the algorithm illustrated in FIG. 5B. At steps S525 and S528, MR 122 configures a care-of address from the prefix 172, establishes a tunnel with MR 121, and performs duplicate address detection of the new care-of address over the tunnel. This is shown as the DAD message 612 in FIG. 6. When MR 121 receives this DAD message 612, it forwards the message to other network interfaces where the prefix 172 is valid. At this point, the prefix 172 is valid only on the access network link 102 and the tunnel with MR 122. So, MR 121 forwards the DAD message 612 to the access network link 102, as shown in FIG. 6 as the DAD message 614.

After a short time period 616, in case that no address conflict is detected, MR 122 proceeds to step S530, where it needs to select a child mobile router. However, as there is no child mobile router in the mobile network link 142, MR 122 proceeds to step S590, where it sends a broadcast prefix change message (BPC) 620 to all nodes on the mobile network link 142. VMN 132 will then know that the prefix 171 is no longer valid, and configure a new care-of address from the prefix 172. VMN 132 next proceeds to perform duplicate address detection by sending out a DAD message 622. MR 122, acting as a neighbor discovery proxy, forwards this message through the tunnel interface, as shown in FIG. 6 as the tunneled DAD message 624. When MR 121 receives this DAD message 624, it forwards the message to other network interfaces where the prefix 172 is valid. At this point, the prefix 172 is valid only on the access network link 102 and the tunnel with MR 122. So, MR 121 forwards the DAD message 624 to the access network link 102, as shown in FIG. 6 as the DAD message 626. After a short time period 628, MR 121 detects no more DAD activities from the tunnel with MR 122. So, MR 121 will proceed from step S580 back to step S530, where MR 121 selects MR 123 as the next child mobile router to receive the selective prefix change notification. This is shown in FIG. 6 as the SPC message 630.

Having received this SPC message 630, MR 123 will know that the prefix has changed to the prefix 172, and trigger the algorithm illustrated in FIG. 5B. At steps S525 and S528, MR 123 configures a care-of address from the prefix 172, establishes a tunnel with MR 121, and performs duplicate address detection of the new care-of address over the tunnel. This is shown as the DAD message 632 in FIG. 6. When MR 121 receives this DAD message 632, it forwards the message to other network interfaces where the prefix 172 is valid. At this point, the prefix 172 is valid only on the access network link 102 and the tunnels with MR 122 and MR 123. So, MR 121 forwards the DAD message 632 to the access network link 102, as shown in FIG. 6 as the DAD message 634, and to the tunnel with MR 122, as shown in FIG. 6 as the DAD message 636. When MR 122 receives this DAD message 636, it will broadcast the DAD message to the mobile network link 142, as shown by the broadcast DAD message 638 in FIG. 6.

After a short time period 640, in case that no address conflict is detected, MR 123 proceeds to step S530, where it needs to select a child mobile router. However, as there is no child mobile router in the mobile network link 143, MR 123 proceeds to step S590, where it sends a broadcast prefix change message (BPC) 650 to all nodes on the mobile network link 143. VMN 133 will then know that the prefix 171 is no longer valid, and configure a new care-of address from the prefix 172. VMN 133 next proceeds to perform duplicate address detection by sending out a DAD message 652. MR 123, acting as a neighbor discovery proxy, forwards this message through the tunnel interface, as shown in FIG. 6 as the tunneled DAD message 654. When MR 121 receives this DAD message 654, it forwards the message to other network interfaces where the prefix 172 is valid. At this point, the prefix 172 is valid only on the access network link 102 and the tunnels with MR 122 and MR 123. So, MR 121 forwards the DAD message 654 to the access network link 102, as shown in FIG. 6 as the DAD message 656, and to the tunnel with MR 122, as shown in FIG. 6 as tunneled DAD message 658. When MR 122 receives this DAD message 658, it will broadcast the DAD message to the mobile network link 142, as shown by the broadcast DAD message 660 in FIG. 6.

After a short time period 662, MR 121 detects no more DAD activities from the tunnel with MR 123. So, MR 121 will proceed from step S590 back to step S530, where MR 121 tries to select the next child mobile router to receive the selective prefix change notification. However, as there is no other child mobile router, MR 121 proceeds to step S590, where it sends a broadcast prefix change message 670 to the mobile network link 141. VMN 131 will then know that the prefix 171 is no longer valid, and configure a new care-of address from the prefix 172. VMN 131 next proceeds to perform duplicate address detection by sending out a DAD message 672. MR 121, MR 122 and MR 123, acting as neighbor discovery proxies, will forward this DAD message 672 to their respective other interfaces. MR 121 will forward the DAD message 672 to the access network link 102 as the DAD message 678, MR 122 will forward the DAD message 672 to the mobile network link 142 as the DAD message 676, and MR 123 will forward the DAD message 672 to the mobile network link 143 as the DAD message 674.

As illustrated in FIG. 6, LMNN 152 and LMNN 153 can listen to the messages broadcasted at the respective mobile network links 142 and 143 where they are associated to. As the above, LMNN 152 and LMNN 153, however, need not perform address re-configuration due to the prefix change (that is the operation of the present invention), and need not perform any operation or response with respect to these messages.

A person skilled in the relevant art may observe that the above description has not disclosed how a parent mobile router, say MR 121, can know that a mobile network node attached to its mobile network link 141 is a child mobile router, or just a visiting mobile node. There are various ways in which the parent mobile router could know. One preferable way is for the child mobile router to send neighbor advertisement messages to its parent mobile router, and mark in the neighbor advertisement message that it is a mobile router. Another approach is for the parent mobile router, while performing neighbor discovery proxy for its mobile network nodes to monitor how many addresses are being tied to a single hardware address. If there are two or more addresses tied to the same hardware address, then the node with that hardware address is likely to be a mobile router. Yet another preferable alternative is for the parent mobile router to simply treat every mobile network node in its mobile network link to be a mobile router, and send them selective prefix change messages. If the mobile network node is not a mobile router, it will not understand the selective prefix change message and there will be no response. Soon, after a timeout period, the mobile router will proceed with the next step in the algorithm seeing there is no DAD activity.

Furthermore, a parent mobile router may impose some kind ordering when selecting child mobile routers to notify of the prefix change. For instance, such ordering may be influenced by the number of packets transmitted for a pre-determined past period of time by each child mobile router, the number of mobile network nodes that are attached to each child mobile router (especially, the number of mobile network nodes except for local mobile network nodes, that is, the number of mobile network nodes necessary to re-configure addresses), or the priority settings of each child mobile router. Alternatively, the ordering may be entirely arbitrary or random.

The second method to reduce the signaling burst is for each mobile router to accumulate the list of new addresses from its own mobile network, before passing this list of addresses up to its parent mobile router or its access router. Using the example depicted in FIG. 1A, MR 122 will collect the new addresses from the mobile network link 142 first, before passing the list of addresses to MR 121. Similarly, MR 121 will collect the new addresses from the mobile network link 141 and the lists of addresses from MR 1.22 and MR 123 before performing duplicate address test for these collected addresses on the access network link 101. When collecting the list of addresses from its own mobile networks, each mobile router can check if address conflicts occur within the list. Address conflicts can then be resolved immediately before passing the list of addresses up. In essence, this method localizes the duplicate address detection process to each mobile network link at first, and slowly propagating the duplicate address detection process upstream. Due to the nature of its operation, this method is henceforth referred to as the method of aggregating duplicate address detection.

Figure 7:
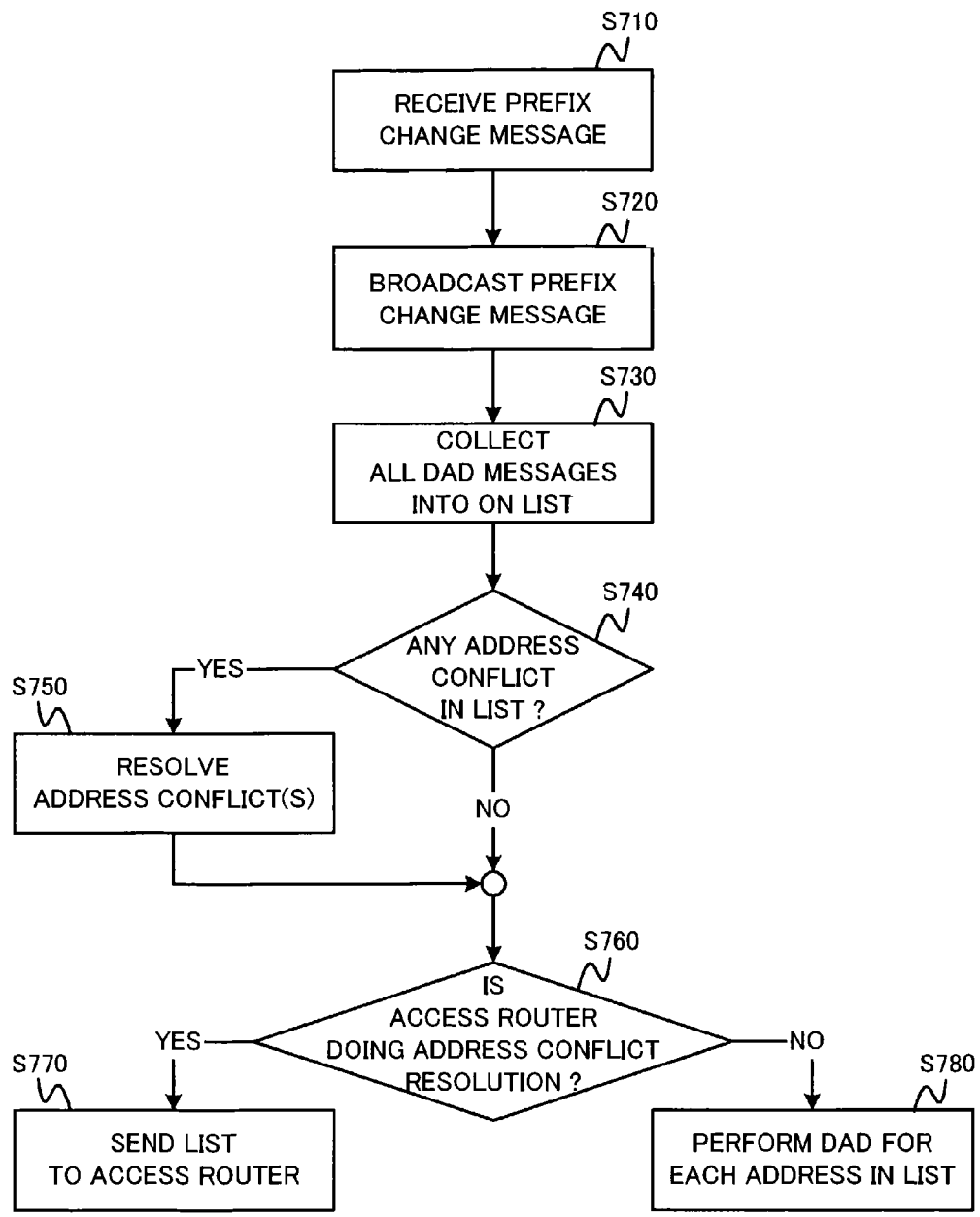
FIG. 7 is a flowchart of a preferred algorithm which a mobile router can use to perform the method of aggregating duplicate address detection after the mobile router receives a prefix change message in the embodiment of the present invention.

FIG. 7 shows the flowchart of the algorithm a mobile router 120 can preferably use to achieve the method of aggregating duplicate address detection after receiving the prefix change message, according to the embodiment of the present invention. At step S710 in FIG. 7, the mobile router 120 receives a prefix change message from the upstream. This prefix change message can be in the form of a router advertisement which advertises a new prefix, or it can be a DHCP message informing the mobile router 120 that the prefix used has changed. At step S720, the mobile router 120 will then broadcast this change of prefix to its mobile network (again, either by use of router advertisement or DHCP message). Next, at step S730, the mobile router 120 starts collecting the new addresses configured from the new prefix and used by mobile network nodes on its mobile network link. It is preferable that the collected addresses are stored in a single list. These new addresses include new addresses captured from DAD messages sent by mobile network nodes, and lists of addresses sent by child mobile routers. Note that at this point, the mobile router 120 has not yet performed the neighbor discovery proxy function. One preferable implementation of this list of addresses is to use the ND-Proxy Table 240.

After collecting the list of addresses, the mobile router 120 next checks if there are any duplicate addresses in the list in step S740. If there are duplicate addresses, the address conflict is resolved, as shown in step S750. There are many ways in which address conflicts can be resolved. One preferred method is for the mobile router 120 to emulate a duplicate address, by sending neighbor advertisement message to the node using the address in conflict. This would cause the node to detect a duplicated address, and attempt to re-configure another address. Another preferred method is for the mobile router 120 to search for an unused address within the new prefix, and assign this address to the node which is using the duplicated address.

Once address conflict is resolved in step S750, or if there is no address conflict in step S740, the mobile router 120 proceeds to step S760. In step S760, the mobile router 120 checks if its access router is performing address conflict resolution (like itself). This will be the case if the access router of the mobile router 120 is also a mobile router using the present invention. Additionally, any fixed access router may also implement the present invention and perform address conflict resolution. There are various ways the mobile router 120 can tell if its access router is performing address conflict resolution. One preferred approach would be for any access router (mobile or fixed) to include one or more options in the router advertisement message, or to set the values of certain fields in the router advertisement message, to show that they are capable of performing address conflict resolution.

If the access router of the mobile router 120 is performing address conflict resolution, the mobile router 120 will send the list of addresses to the access router, as shown in step S770. On the other hand, if the access router of the mobile router 120 is not performing address conflict resolution, the mobile router 120 will then perform duplicate address detection for each of the addresses in the list of addresses on the access network link, as shown in step S780.

Figure 8:
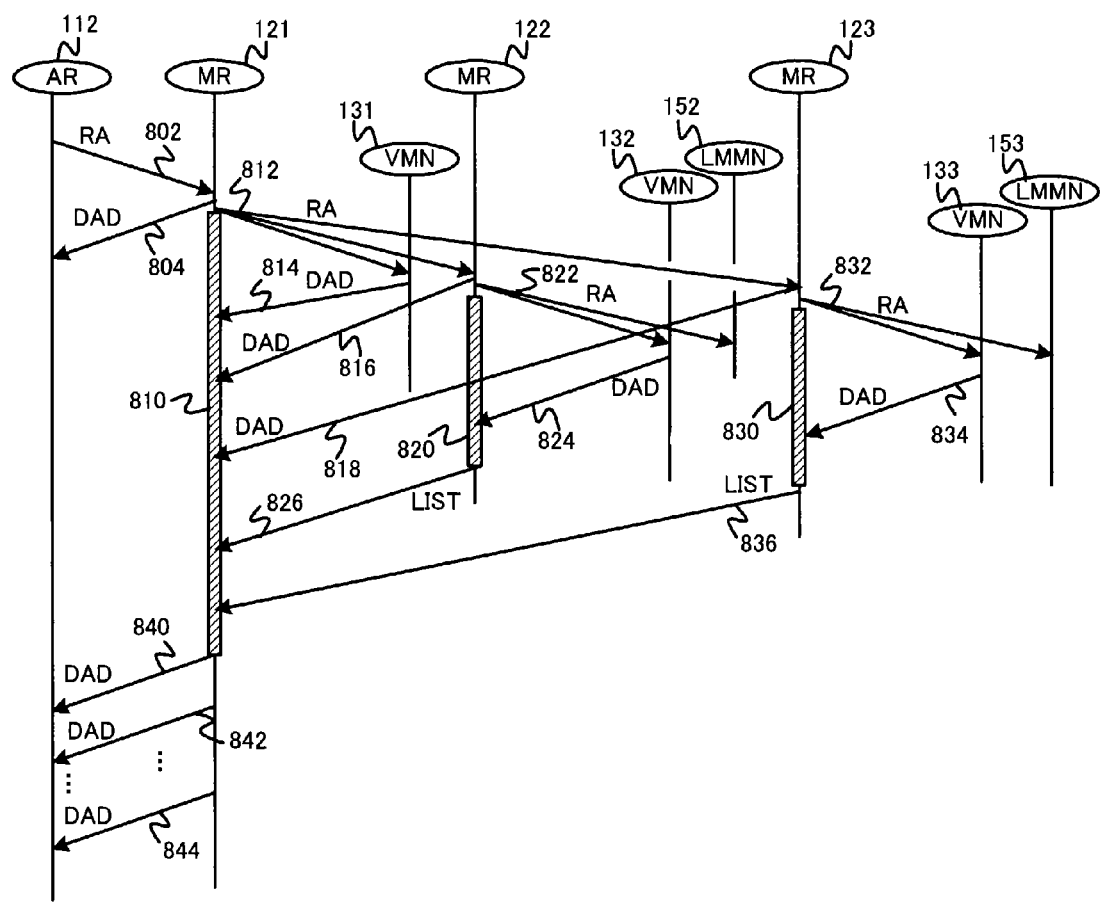
FIG. 8 is a message sequence chart describing an example of the operation when an entire mobile network changes the access network links according to the method of aggregating duplicate address detection in the embodiment of the present invention.

FIG. 8 illustrates the operation of the method of aggregating duplicate address detection. In FIG. 8, the network deployment depicted in FIG. 1A is used as an example. FIG. 8 shows the message sequence chart after MR 121 has changed its point of attachment from the access network link 101 to the access network link 102, according to the embodiment of the present invention. After moving to the access network link 102, MR 121 would receive the periodic router advertisement message RA 802 from AR 112, which contains the new prefix 172. MR 121 notices the prefix change, configures a care-of address from this new prefix 172, and performs duplicate address detection on the access network link 102. Thus, MR 121 broadcasts a DAD message 804 to the access network link 102. It will also trigger the algorithm illustrated in FIG. 7, and at step S720, MR 121 broadcasts the prefix change message 812 (for example, router advertisement message RA) to the mobile network link 141. MR 121 then starts collecting the DAD messages to build the list of new addresses configured from the prefix 172 (i.e. step S730) for the time period 810. This broadcast prefix change message 812 causes MR 122, MR 123 and VMN 131 to configure new care-of addresses based on the network prefix 172, and send their own DAD messages 814, 816 and 818 respectively. MR 121 collects these DAD messages, and constructs the list of new addresses based on these DAD messages.

At the same time, MR 122 and MR 123 will trigger the algorithm illustrated in FIG. 7. At step S720, MR 122 broadcasts the prefix change message 822 (for example, router advertisement message RA) to the mobile network link 142. MR 122 then starts collecting the DAD messages to build the list of new addresses configured from the prefix 172 (i.e. step S730) for the time period 820. This broadcast prefix change message 822 causes VMN 132 to configure a new care-of address based on the network prefix 172, and send its own DAD message 824. MR 122 collects this DAD message and adds it to the list of new addresses. At the end of the time period 820, after collecting the address list and verifying that there is no conflict, MR 122 sends the list to MR 121, as shown in FIG. 8 as the message 826.

Similarly at step S720, MR 123 broadcasts the prefix change message 832 (for example, router advertisement message RA) to the mobile network link 143. MR 123 then starts collecting the DAD messages to build the list of new addresses configured from the prefix 172 (i.e. step S730) for the time period 830. This broadcast prefix change message 832 causes VMN 133 to configure a new care-of address based on the network prefix 172, and send its own DAD message 834. MR 123 collects this DAD message and adds it to the list of new addresses. At the end of the time period 830, after collecting the address list and verifying that there is no conflict, MR 123 sends the list to MR 121, as shown in FIG. 8 as the message 836.

At the end of time period 810, after MR 121 has collected the list of new addresses, it starts inspecting the list for conflicts. If no conflict is found, since AR 112 is not performing address conflict resolution, MR 121 will perform duplicate address detection for the list of new addresses on the access network link 102. This is shown in FIG. 8 as DAD messages 840, 842 and 844.

As illustrated in FIG. 8, LMNN 152 and LMNN 153 can listen to the messages broadcasted at the respective mobile network links 142 and 143 where they are associated to. As the above, LMNN 152 and LMNN 153, however, need not perform address re-configuration due to the prefix change:

(that is the operation of the present invention), and need not perform any operation or response with respect to these messages.

Figure 9A:
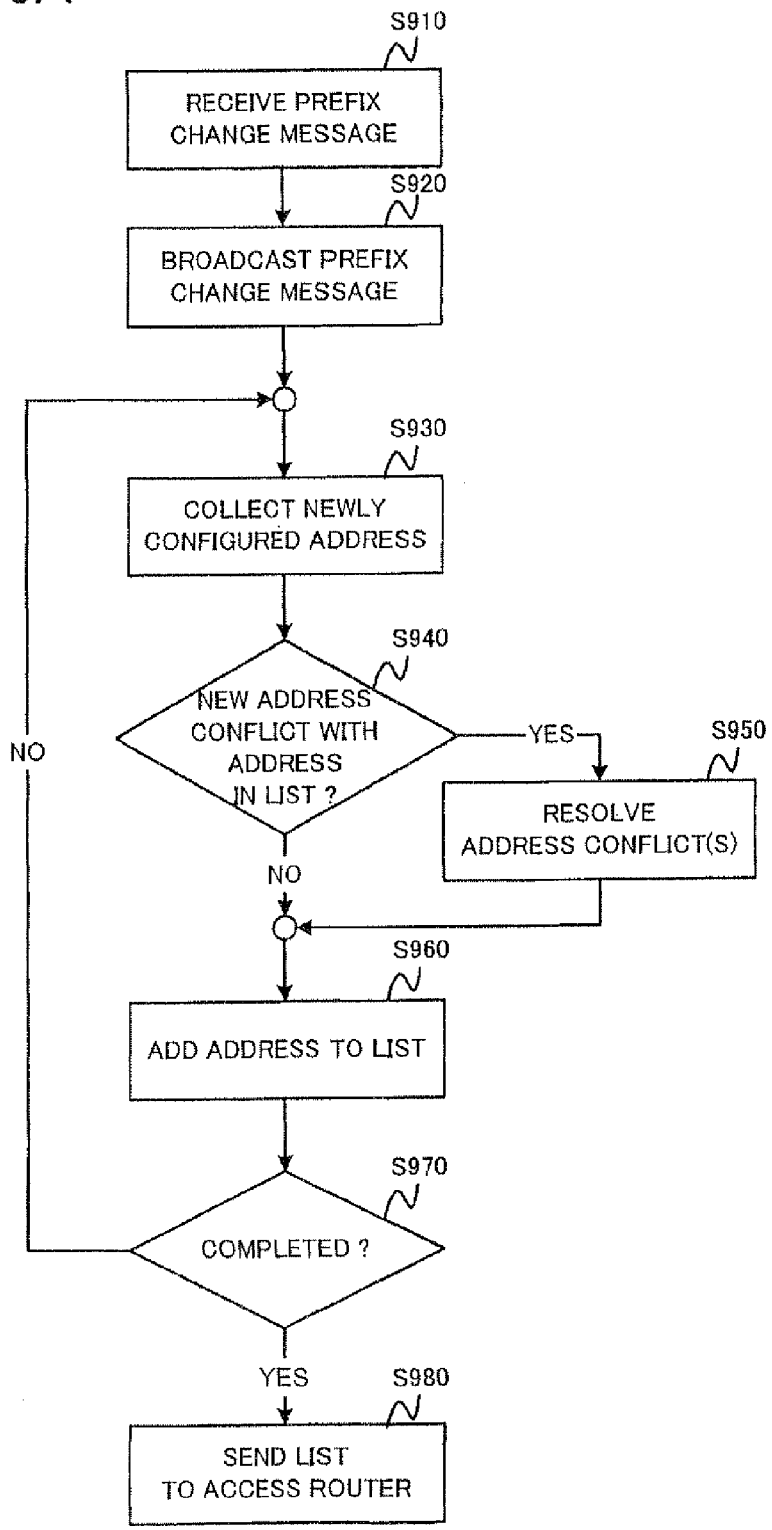
FIG. 9A is a flowchart of a preferred algorithm used when an upper % router of a mobile router is performing address conflict resolution according to the method of aggregating duplicate address detection in the embodiment of the present invention.
Figure 9B:
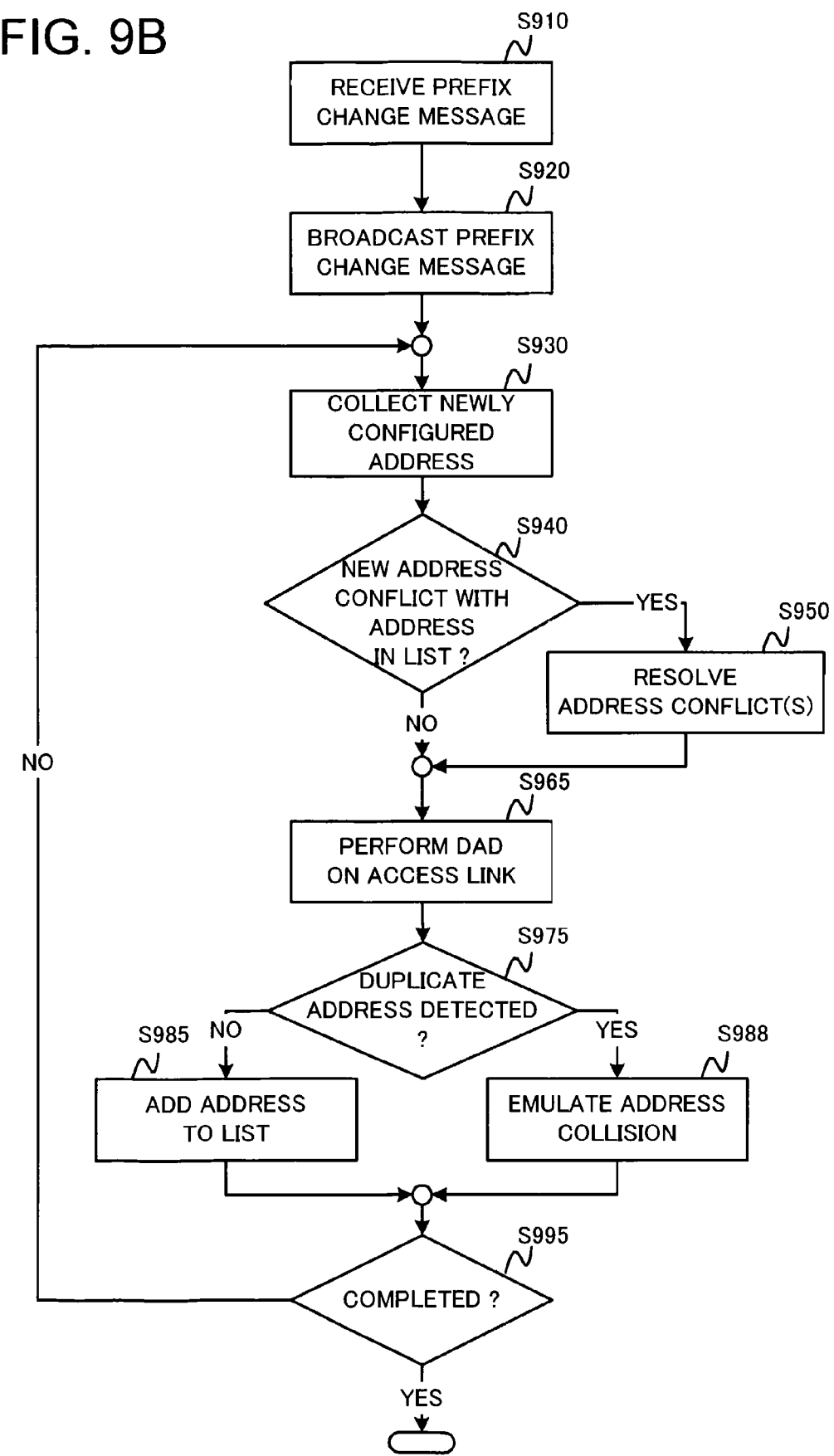
FIG. 9B is a flowchart of a preferred algorithm used when an upper router of a mobile router is not performing address conflict resolution according to the method of aggregating duplicate address detection in the embodiment of the present invention.

A person skilled in the art would notice that there is a relatively significant delay from the broadcast of the DAD message on the access network link 102 until actually performing duplicate address detection by a node. Such delay can cause the node to prematurely assume that there is no duplicate address. Under normal circumstances, the probability of a duplicate address is very small, thus this is not a major concern. However, one can actually resolve this concern by using an enhanced method as illustrated in FIG. 9A and FIG. 9B. The enhanced method requires that the mobile router 120 detects its access router not performing address conflict resolution to use the flowchart depicted in FIG. 9B, and that the mobile router 120 detects its access router performing address conflict resolution to use the flowchart depicted in FIG. 9A. The enhancement of the method is actually very simple: the mobile router to check for address duplicate as soon as possible, while not creating any signaling burst.

For the mobile router 120 that detects its access router is performing address conflict resolution, the algorithm depicted in FIG. 9A is actually very similar to that shown in FIG. 7. After receiving the prefix change broadcast in step S910, the mobile router 120 will proceed to broadcast the prefix change message to its mobile network at step S920. Thereafter, the mobile router 120 goes in to a loop from steps S930 through S970 where it collects newly configured addresses from its mobile network link. Whenever a new DAD message is captured by the mobile router in step S930, the mobile router 120 will check if this new address is in conflict with those addresses already in the list in step S940. If a conflict is found, the mobile router 120 will resolve this conflict, as shown in step S950. If no conflict is found, or if the conflict has been resolved in step S950, the address is added to the list as shown in step S960, and the algorithm loops back to step S930, unless the time period for address collection has expired. In case that the time period for address collection has expired, the loop is exited and the address list is sent to the access router, as shown in step S980. One can see that in this enhanced method, an address conflict is immediately resolved, instead of waiting for the entire address list to be constructed before conflict resolution is carried out.

For the mobile router 120 that detects its access router is not performing address conflict resolution, the algorithm depicted in FIG. 9B is actually very similar to that shown in FIG. 9A. Those steps that are identical are thus given the same reference numerals. After receiving the broadcast prefix change message in step S910, the mobile router 120 will proceed to broadcast the prefix change message to its mobile network at step S920. Thereafter, the mobile router 120 goes into a loop from steps S930 through S960 where it collects newly configured addresses from its mobile network link. Whenever a new DAD message is captured by the mobile router in step S930, the mobile router 120 will check if this new address is in conflict with those addresses already in the list in step S940.

If a conflict is found, the mobile router 120 will resolve this conflict, as shown in step S950. If no conflict is found in step S940, or if the conflict has been resolved in step S950, the mobile router 120 will perform duplicate address detection on the access network link as shown in step S965. If there is a duplicate address on the access network link, the conflict is immediately resolved in step S988 by emulating an address collision on the mobile network link. Else, the address is added to the list as shown in step S985. The algorithm then loops back to step S930, unless the time period for address collection has expired in step S995. One can see that in this enhanced method, an address conflict is immediately resolved, instead of waiting for the entire address list to be constructed before conflict resolution is carried out.

Figure 10:
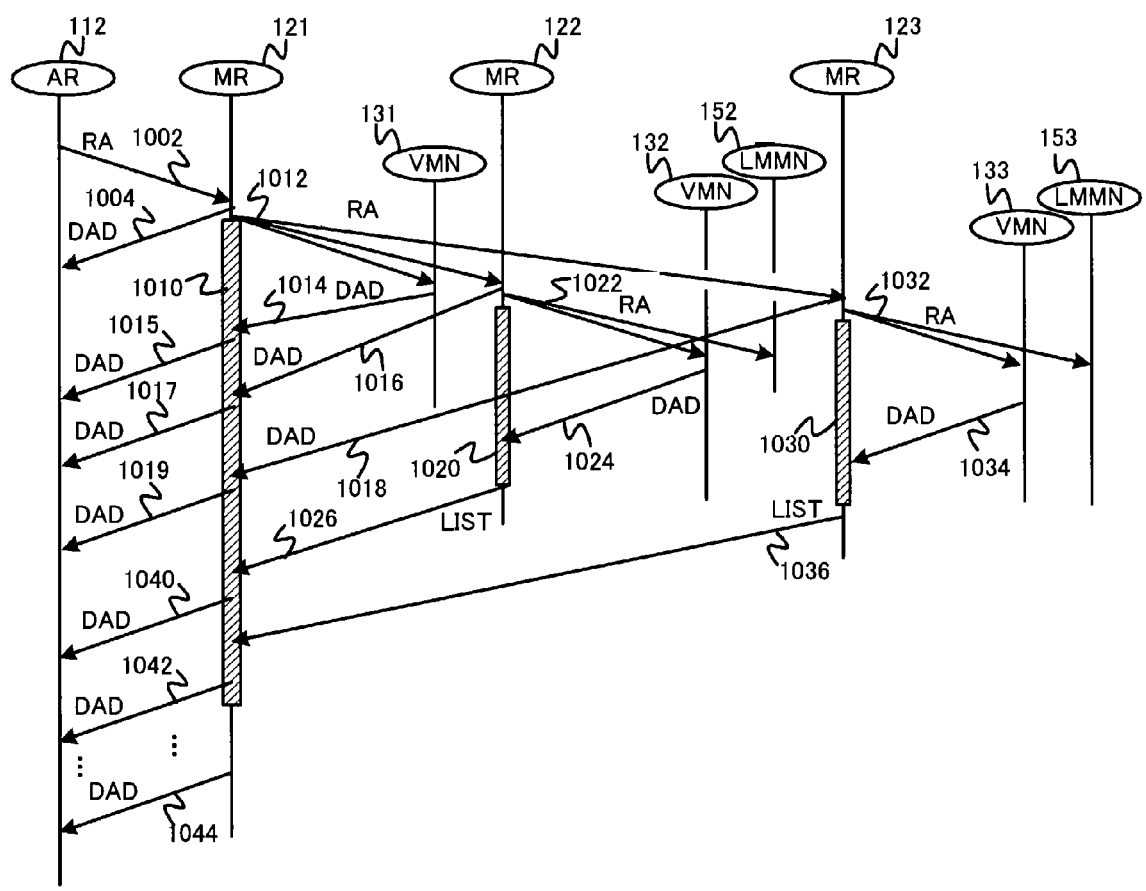
FIG. 10 is a message sequence chart describing another example of the operation when an entire mobile network changes the access network links according to the method of aggregating duplicate address detection in the embodiment of the present invention.

FIG. 10 illustrates the operation of the method of aggregating duplicate address detection. In FIG. 10, the network deployment depicted in FIG. 1A is used as an example. FIG. 10 shows the message sequence chart after MR 121 changes its point of attachment from the access network link 101 to the access network link 102, according to the present invention. After moving to the access network link 102, MR 121 would receive the periodic router advertisement RA 1002 from AR 112, which contains the new prefix 172. MR 121 notices the prefix change, configures a care-of address from this new prefix 172, and performs duplicate address detection on the access network link 102. Thus, MR 121 broadcasts a DAD message 1004 to the access network link 102. It will also trigger the algorithm illustrated in FIG. 9B, since MR 121 detects that the access router AR 112 does not perform address conflict resolution. At step S920, MR 121 broadcasts the prefix change message 1012 to the mobile network link 141. MR 121 then starts collecting the DAD messages to build the list of new addresses configured from the prefix 172 (i.e. steps S930 through S995) for the time period 1010. This broadcast message 1012 causes MR 122, MR 123 and VMN 131 to configure new care-of addresses based on the network prefix 172, and send their own DAD messages 1014, 1016 and 1018 respectively. MR 121 collects these DAD messages, and constructs the list of new addresses based on these DAD messages. MR 121 also performs DAD on the access network link 102 as it receives the DAD messages 1014, 1016 and 1016, as required by step S965. These are shown in FIG. 10 as DAD messages 1015, 1017 and 1019 respectively.

At the same time, MR 122 and MR 123 will trigger the algorithm illustrated in FIG. 9A. At step S920, MR 122 broadcasts the prefix change message 1022 to the mobile network link 142. MR 122 then starts collecting the DAD messages to build the list of new addresses configured from the prefix 172 (i.e. steps S930 through S970) for the time period 1020. This broadcast prefix change message 1022 causes VMN 132 to configure a new care-of address based on the network prefix 172, and send its own DAD message 1024. MR 122 collects the DAD message, checks if the new address conflicts with those in the address list, and then adds it to the list of new addresses. At the end of the time period 1020, after collecting the address, MR 122 sends the list to MR 121, as shown in FIG. 10 as the message 1026.

Similarly at step S920, MR 123 broadcasts the prefix change message 1032 to the mobile network link 143. MR 123 then starts collecting the DAD messages to build the list of new addresses configured from the prefix 172 (i.e. steps S930 through S970) for the time period 1030. This broadcast message 1032 causes VMN 133 to configure a new care-of address based on the network prefix 172, and send its own DAD message 1034. MR 123 collects this DAD message, check if the new address conflicts with those in the address list, and adds it to the list of new addresses. At the end of the time period 1030, after collecting the address, MR 123 sends the list to MR 121, as shown in FIG. 10 as the message 1036.

When MR 121 receives the list of addresses from MR 122 and MR 123, MR 121 repeats the same loop (steps S930 through S995) for each address in the lists. This involves first checking they conflict with addresses in the list of MR 121, and performing duplicate address detection on the access network link 102. These are shown by DAD messages 1040, 1042 and 1044. If no conflict is detected, the addresses are added to the list of MR 121.

Under normal circumstances, a mobile network would usually move in entirety, such as a network in a vehicle/vessel or a personal area network. Hence, in the method of aggregating duplicate address detection, the mobile router 120 can make use of this characteristic and cache the new address list collected previously. Preferably, the collected address list is stored in the ND-Proxy Table 240. Hence, when the mobile router 120 detects a change in the network prefix, it can automatically generate a list of new addresses from the previously constructed address list (such as that stored in the ND-Proxy Table 240) by changing the network prefix of the addresses in the list. This will enable the mobile router 120 to rapidly submit the list to its access router (if the access router performs address conflict resolution) or perform DAD for the addresses in the list on the access network link (if the access router does not perform address conflict resolution), without having to wait for mobile network nodes to perform their own DAD.

As illustrated in FIG. 10, LMNN 152 and LMNN 153 can listen to the messages broadcasted at the respective mobile network links 142 and 143 where they are associated to. As the above, LMNN 152 and LMNN 153, however, need not perform address re-configuration due to the prefix change (that is the operation of the present invention), and need not perform any operation or response with respect to these messages.

Figure 1B:
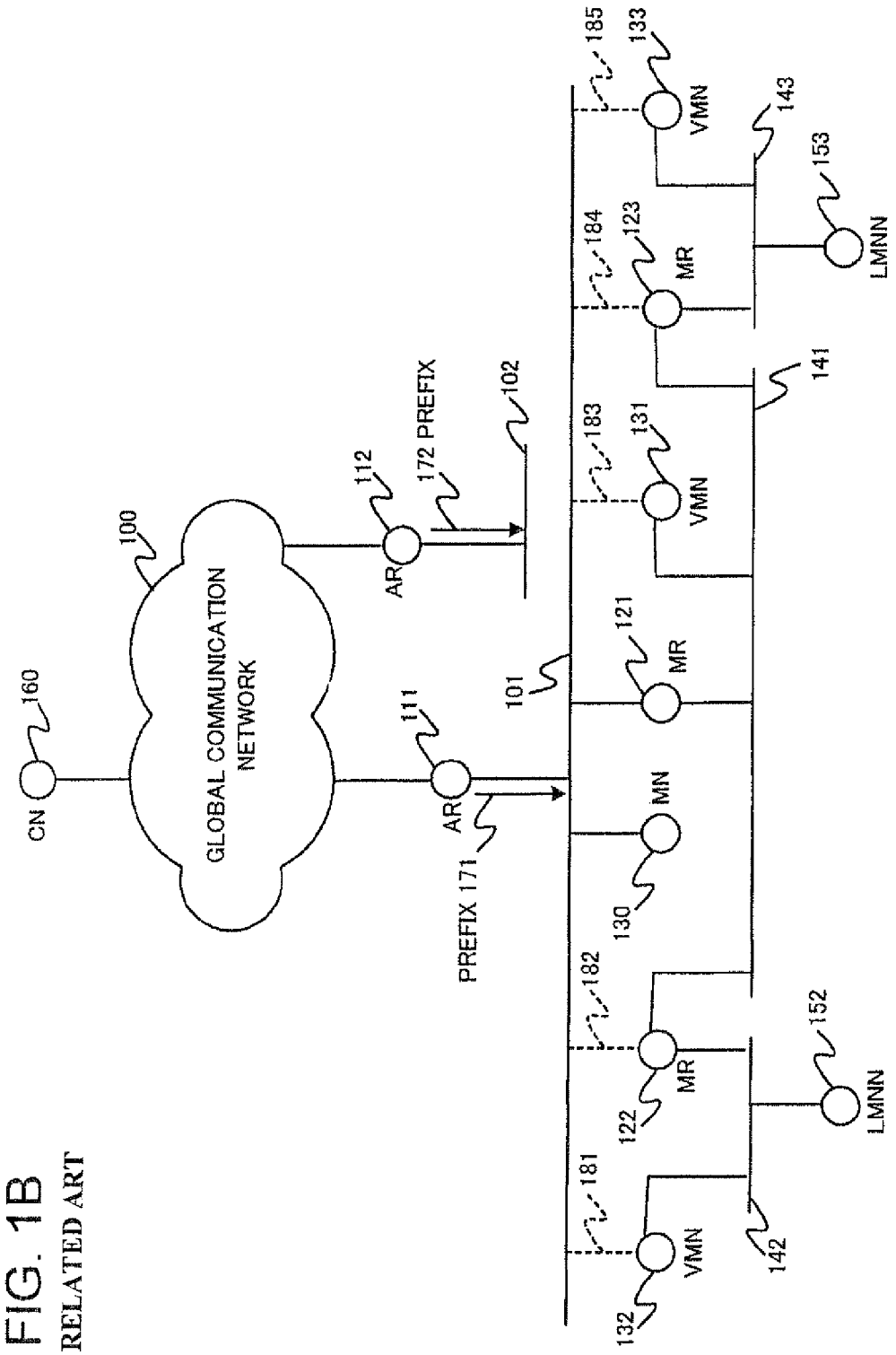
FIG. 1B is a schematic diagram showing logical connection of the network composition illustrated in FIG. 1A.

A person skilled in the art would also appreciate that although the examples illustrated in this description assume that the fix access routers (such as AR 111 and AR 112) does not implement the methods described in the present invention, it is possible and in fact preferable, that the fix access routers can also perform address conflict resolution. In particular, these access routers can also accept the lists of addresses from mobile routers, and perform address conflict checks and resolution by comparing one list with other lists. In this case, the access router residing at the top of the nested composition of a network (such as AR 112 which MR 121 connects after moving in the example of FIG. 1) preferably performs the address conflict resolution. Furthermore, MR residing at the middle of the nested composition (such as MR 121, MR 122 and MR 123 in the example of FIG. 1) may resolve address duplication detection and address conflict resolution for nodes that resides at the downstream from itself, and send the list of addresses including no address duplication with respect to all nodes residing at the downstream from itself. MR residing at the middle of the nested composition can determine in itself whether it performs the address conflict resolution or not. For example, in case that MR has determined to perform the address conflict resolution, MR can announce to downstream nodes that it performs the address conflict resolution, thus the lists of addresses will be aggregated.

When the access router also holds the list of addresses used by a mobile network, it can further reduce the possibility of a signaling burst and yet at the same time speed up the process of handoff. For instance, a plurality of access routers may co-operate with each other to enable fast handoff for mobile networks. When one access router detects that a mobile network is about to leave its access network to join a new access network, the access router can contact an access router of the new access network, and pass the list of addresses used by the mobile network to the new access router along with other context transfer. The new access router can then perform address conflict resolution based on this list even before the mobile network arrives. When the mobile network does arrive, the new access router can immediately pass the resolved address list to the mobile router. This is illustrated in FIG. 11.

Figure 11:
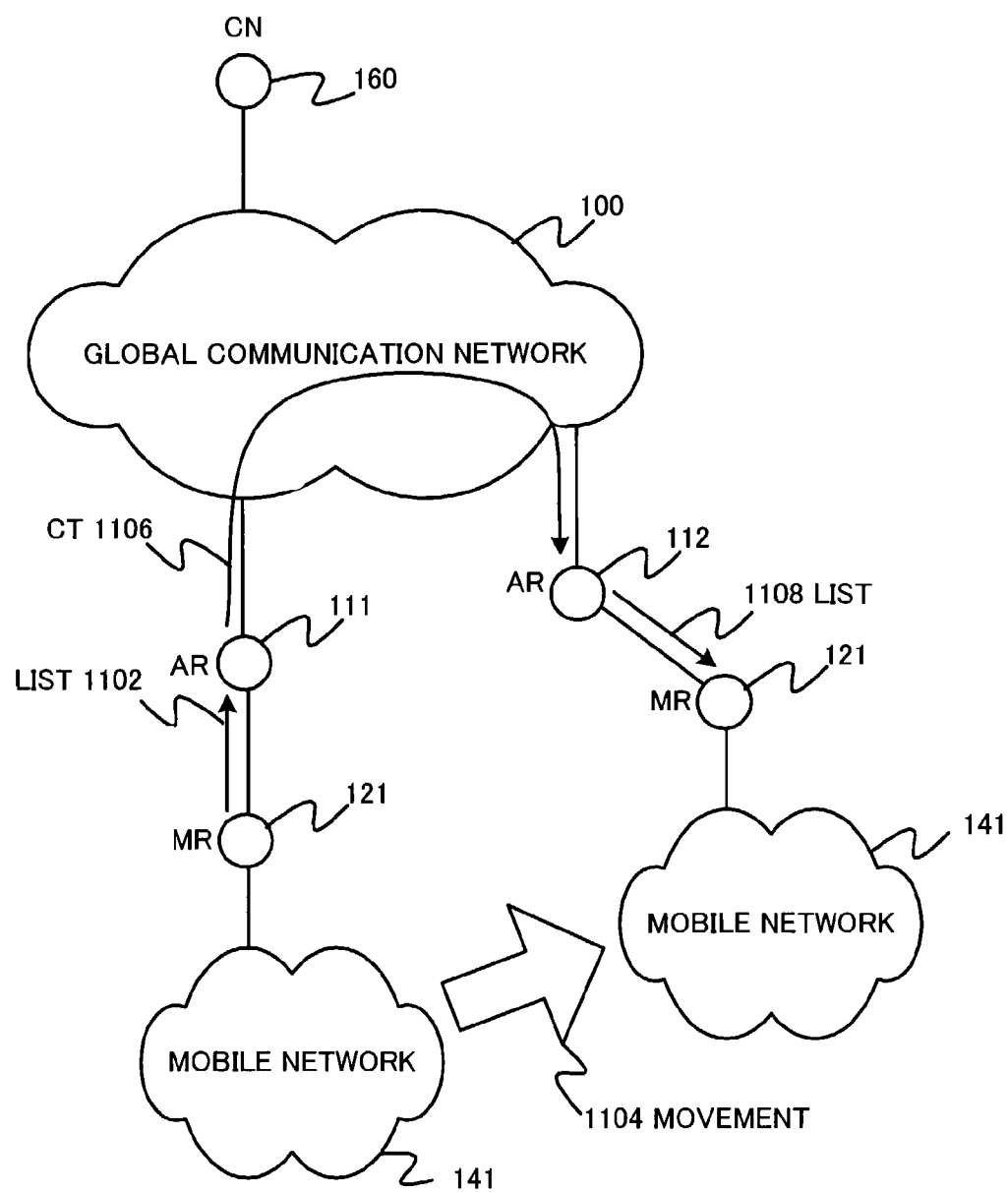
FIG. 11 is a diagram schematically showing a situation to realize fast handoff by using context transfer according to the method of aggregating duplicate address detection in the embodiment of the present invention.

In FIG. 11, MR 121 initially sends to the access router 111 the list of addresses 1102' used by the mobile network 141. After some time, AR 111 detects that MR 121 is moving towards AR 112, as indicated by the movement 1104. AR 111 can then initiate a context transfer (CT) 1106 to the access router 112. CT 1106 includes the list of addresses 1102. When MR 121 completes its movement 1104 to be attached to AR 112, AR 112 can immediately send to MR 121 a resolved list of new addresses 1108. This illustrates how the present invention can be used in context transfer for fast handoff as well. In addition, the illustration shows the access router detecting the movement and initiating the context transfer. A person skilled in the art will immediately recognize that the same detection of movement and transfer of context could be initiated by the mobile router itself. In this case, once the mobile router detects the movement, it can initiate a context transfer to the new access router. The list of addresses is included in the context transferred so that when the mobile router attaches to the new access router, the new access router can immediately send a resolved list of addresses to the mobile router. Furthermore, when MR 121 moves from AR 111 to AR 112, a procedure of FMIP (Fast Handovers for Mobile IP) can be incorporated as CT (or part of CT). According to the combination of the present invention and FMIP (and also CT), the list of addresses can be transferred more efficiently and promptly.

Two different methods (the method of aggregating duplicate address detection and the method of selective notification) of the present invention have been disclosed in this description. A person skilled in the art will appreciate that the two methods can be combined in actual implementation to supplement each other. For instance, MR 121 in FIG. 1A can choose to selectively notify MR 122 at the first of the prefix change. Only when MR 122 has submitted its list of addresses, then MR 121 would inform MR 123 of the prefix changes. This is useful for a large nested mobile, network, because if all child mobile routers submit the lists of addresses at the same time, the resulting processing load and amount of DAD messages required may cause significant delays to address resolution. Due to the delays, some mobile network nodes may have already assumed that their addresses are not duplicated before the parent mobile router can actually perform address resolution.

In the description, the case is described as an example where a general DAD is applied to the present invention. Moreover, various DAD improvement (i.e. improved DAD) can be applied to the present invention. Especially, in the method of aggregating duplicate address detection of the present invention, after aggregating the lists of addresses, the aggregated list can be processed by an improved DAD, not performing DAD for individual addresses. This way enables function of both the address aggregation due to the method of aggregating duplicate address detection of the present invention and the improved DAD procedure due to the improved DAD to be synergistically enhanced, and thereby the operation can become more efficient and prompt.

In the description, the route optimization scheme of neighbor discovery proxy is used exclusively as the main approach for providing route optimization. However, a person skilled in the relevant art should appreciate that the approaches described here are not limited to the ND-Proxy based route optimization, and may be used in other route optimization, schemes as well.

For instance, consider the case where the top-level mobile router (TLMR) terminates all route optimization sessions on behalf of its mobile network nodes. All mobile network nodes that desire to use route optimization, no matter how deeply they are nested within the mobile network, would use the TLMR's care-of address as their own care-of addresses when communicating with other nodes in the Internet. In such a scheme, a change in the point of attachment of the TLMR would cause all mobile network nodes to change their external care-of addresses as well (since they are all using the TMLR's care-of address). This would generate a burst of binding update messages whenever the mobile network moves. The approach of selective notification would be useful here, for the TLMR to selectively notify mobile network nodes of the change in its care-of address. This would spread the generation of binding update messages.

Another application would be when the mobile network nodes use some kind of Hierarchical Mobile IP based approach to achieve route optimization. In such a scheme, a mobile network node would get a regional care-of address from a mobility anchor point (MAP). Mobile network nodes then use these regional care-of addresses to communicate with nodes in the Internet. In such a scheme, a change in the point of attachment of the TLMR that would cause a change in mobility anchor point would result in all mobile network nodes having to change their regional care-of addresses as well. This would generate a burst of binding update messages whenever the mobile network moves out of a MAP's domain. The approach of selective notification would be useful here, for the TLMR to selectively notify mobile network nodes of the change in its care-of address. This would spread the generation of binding update messages over a longer period of time, thereby avoiding a sudden burst in packets transmission.

Although the invention has been herein shown and described in what is conceived to be the most practical and preferred embodiment, it will be appreciated by those skilled in the art that various modifications may be made in details of design and parameters without departing from the scope and ambit of the invention. For instance, the present invention has been disclosed in such a way that address auto-configuration is used as examples in the illustrations of the operation of the present invention. A person skilled in the art will appreciate that the present invention can also be applied for address assignments through dynamic host configuration protocol. This is explained below.

When using the method of selective notification, only the child mobile router selected will be notified with the change in prefix. Thus, the DHCP server needs only serve address assignment request from mobile network nodes behind the selected child mobile routers. Only after all address assignment requests have been processed from the selected child mobile router, then the next child mobile router would be notified of the prefix change.

When using the method of aggregating duplicate address detection, each child mobile router would aggregate all address assignment requests into a list before submitting this list to its parent mobile router. In this way, the DHCP server is only present with one big request, instead of multiple small requests. Although when DHCP is used, this method of aggregating duplicate address detection should be more correctly named as the method of collecting address assignment requests, a person skilled in the art will appreciate that the name is a mere triviality and will recognize that the basic principles of the present invention will still apply.

Each functional block used in the above-mentioned embodiments of the present invention is typically realized as an LSI (Large Scale Integrated Circuit) which is an Integrated Circuit. Functional blocks can be processed into 1-chip respectively, and part or all of functional blocks can be processed into 1-chip so as to be included in 1-chip. The above LSI can be called IC (Integrated Circuit), System LSI or Super LSI, according to the degree of integration.

Furthermore, the way to be processed into Integrated Circuit is not only to manufacture LSI but also to produce a dedicated circuit or a general processor. After manufacturing LSI, FPGA (Field Programmable Gate Array) to be programmable, or Reconfigurable Processor to be reconfigure connection or configuration of circuit cells in LSI can be utilized.

Furthermore, if another new technology of integration substituting for. LSI appears due to development of the semiconductor technology or creation of another technology, functional blocks can be of course integrated by using the new technology. For example, the biological technology may be the new technology.

INDUSTRIAL APPLICABILITY

The present invention has the advantage of reducing the burst of DAD messages which may be triggered by the network prefix change. The present invention can be applied to the technique of network management to manage a packet-switched data communication network such as IP network, or to the technique of IP communication.

The invention claimed is:

1. A network management apparatus comprising:
 a first network interface configured to connect to a first network managed by a different apparatus from the network management apparatus;
 a second network interface configured to connect to a second network managed by the network management apparatus;
 a prefix advertising unit configured to advertise a valid network prefix on the first network to the second network as a valid network prefix on the second network; and
 a burst controlling unit configured to control a burst of traffic triggered by a network prefix change advertisement including a new network prefix advertised on the first network,
 wherein the burst controlling unit comprises:
 a prefix notification selection unit configured to select at least one of a plurality of network management apparatuses which are connected to the second network when the network prefix change advertisement including the new network prefix is received on the first network interface; and
 a selective prefix advertising unit configured to advertise the network prefix change advertisement including the new network prefix to the selected at least one network management apparatus selected by the prefix notification selection unit.

2. The network management apparatus according to claim 1, wherein the prefix notification selection unit is configured to respectively select network management apparatuses from among the plurality of network management apparatuses which are connected to the second network in sequence at different times.

3. The network management apparatus according to claim 2, wherein the prefix advertising unit is configured to initiate advertisement of the new network prefix as a valid prefix on the second network after the prefix notification selection unit completes selecting all of the plurality of network management apparatuses which are connected to the second network.

4. The network management apparatus according to claim 1, further comprising a tunnel establishing unit configured to establish a tunnel with the selected at least one network management apparatus selected by the prefix notification selection unit.

5. The network management apparatus according to claim 4, further comprising a tunnel monitoring unit configured to monitor packet traffic received through the tunnel, wherein the prefix notification selection unit is configured to select at least one other of the plurality of network management apparatuses which have not yet been selected when the packet traffic becomes lower than a predetermined threshold level.

6. The network management apparatus according to claim 1, further comprising a tunnel establishing unit configured to establish a tunnel with a sender of the network prefix change advertisement when the network prefix change advertisement including the new network prefix is received on the first network interface; and
a tunnel forwarding unit configured to, when receiving a duplicate address detection message related to an address which is configured based on the new network prefix by a certain communication apparatus, forward the duplicate address detection message through the tunnel.

7. The network management apparatus according to claim 6, further comprising a tunnel tearing unit configured to tear the tunnel down when receiving a broadcast message including the new network prefix on the first network interface.

8. The network management apparatus according to claim 1, further comprising:
an address collecting unit configured to collect addresses which are configured based on the new network prefix by all communication apparatuses residing in the second network when the new network prefix changes; and
an address list creating unit configured to create an address list in which all the collected addresses collected by the address collecting unit are specified.

9. The network management apparatus according to claim 8, further comprising an address list sending unit configured to send the address list created by the address list creating unit within the first network through the first network interface.

10. The network management apparatus according to claim 8, further comprising an address list receiving unit configured to receive another address list created by a network management apparatus which is connected to the second network and manages a third network, wherein the address list creating unit is configured to create the address list to further include other addresses which are specified in the other address list received by the address list receiving unit.

11. The network management apparatus according to claim 8, further comprising an address conflict checking unit configured to check a conflict among the addresses, wherein the address list creating unit is configured to insert an address for which no conflict has been determined by the address conflict checking unit to the address list.

12. The network management apparatus according to claim 11, further comprising an address conflict resolving unit configured to resolve a conflict with respect to an address with the conflict found by the address conflict checking unit.

13. The network management apparatus according to claim 12, wherein the address conflict resolving unit is mounted on an access router or a mobile router.

14. The network management apparatus according to claim 13, further comprising an address conflict resolution performance advertising unit configured to advertise, to lower-level connected communication apparatuses behind the network management apparatus, that the address conflict resolving unit performs procedures to resolve the conflict.

* * * * *

UNITED STATES PATENT AND TRADEMARK OFFICE
CERTIFICATE OF CORRECTION

| | | |
|---|---|---|
| PATENT NO. | : 8,107,448 B2 | Page 1 of 1 |
| APPLICATION NO. | : 12/089599 | |
| DATED | : January 31, 2012 | |
| INVENTOR(S) | : Jun Hirano et al. | |

It is certified that error appears in the above-identified patent and that said Letters Patent is hereby corrected as shown below:

On Title Page, Item (57), Abstract, line 6, incorrectly reads:
"102, MR 121 receives advertisement of a new prefix 172 from"
and should read:
"102, MR 121 receives advertisements of a new prefix 172 from"

On Title Page, Item (57), Abstract, line 7, incorrectly reads:
"AR 112. MR 121 selects and informs, for example only MR"
and should read:
"AR 112. MR 121 selects and informs, for example, only MR"

On Title page 2, Item (56), Other Publications, line 3, incorrectly reads:
"Jeong, et al., "ND-Proxy based Route Optimization for Mobile"
and should read:
"J. Jeong, et al., "ND-Proxy based Route Optimization for Mobile"

On Title page 2, Item (56), Other Publications, line 5, incorrectly reads:
"dard-Working-Draft, draft-jeong-neuro-ro-ndproxy-00.txt, Jun. 7,"
and should read:
"dard-Working-Draft, draft-jeong-nemo-ro-ndproxy-00.txt, Jun. 7,"

Signed and Sealed this
Nineteenth Day of June, 2012

David J. Kappos
*Director of the United States Patent and Trademark Office*